US011891046B2

(12) United States Patent
Hu et al.

(10) Patent No.: US 11,891,046 B2
(45) Date of Patent: Feb. 6, 2024

(54) INFORMATION PROCESSING METHOD, INFORMATION PROCESSING SYSTEM, AND CONTROL DEVICE

(71) Applicant: Panasonic Intellectual Property Management Co., Ltd., Osaka (JP)

(72) Inventors: Beier Hu, Osaka (JP); Kazuma Takeuchi, Kyoto (JP); Shinji Ohyama, Osaka (JP); Motoshi Anabuki, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/844,963

(22) Filed: Jun. 21, 2022

(65) Prior Publication Data

US 2022/0324435 A1  Oct. 13, 2022

Related U.S. Application Data

(63) Continuation of application No. PCT/JP2020/047115, filed on Dec. 17, 2020.

(30) Foreign Application Priority Data

Dec. 25, 2019  (JP) .................................. 2019-234700

(51) Int. Cl.
*B62D 6/00* (2006.01)
*B60W 30/02* (2012.01)

(52) U.S. Cl.
CPC .............. *B60W 30/02* (2013.01); *B62D 6/00* (2013.01); *B60W 2420/42* (2013.01); *B60W 2530/10* (2013.01)

(58) Field of Classification Search
CPC ............. B60W 30/02; B60W 2420/42; B60W 2530/10; B60W 10/20; B60W 60/001;
(Continued)

(56) References Cited

U.S. PATENT DOCUMENTS

2018/0265127 A1* 9/2018 Walsh .................. B62D 15/021

FOREIGN PATENT DOCUMENTS

CN        115214775 A   * 10/2022
JP        2016-17796    *  2/2016
(Continued)

OTHER PUBLICATIONS

International Search Report (ISR) dated Feb. 16, 2021 in International (PCT) Application No. PCT/JP2020/047115.

*Primary Examiner* — Harry Y Oh
(74) *Attorney, Agent, or Firm* — Wenderoth, Lind & Ponack, L.L.P.

(57) ABSTRACT

An information processing method is executed by a computer and the method includes: obtaining first transported-object information that is transported-object information including a position and a weight of a transported object on a moving body; obtaining a weight of the moving body; generating information indicating a predicted steering angle center value by inputting the first transported-object information obtained and the weight of the moving body obtained into a model generated using second transported-object information, a weight of the moving body, and a steering angle center value of the moving body, the second transported-object information being older transported-object information than the first transported-object information; and outputting the information indicating the predicted steering angle center value to the moving body.

16 Claims, 24 Drawing Sheets

(58) Field of Classification Search
CPC ........ B60W 2540/01; B60W 2540/227; B62D 6/00; B62D 15/0245
See application file for complete search history.

(56) References Cited

FOREIGN PATENT DOCUMENTS

| | | | |
|---|---|---|---|
| JP | 2017-105294 | * | 6/2017 |
| JP | 6383907 | * | 9/2018 |

* cited by examiner

FIG. 2

Reservation information (four-seater vehicle) 14a

| Vehicle ID | Time | Place of departure | Place of destination | Passenger position ||||
|---|---|---|---|---|---|---|---|
| | | | | User 1 | User 2 | User 3 | User 4 |
| 001 | 2019/06/03 | Place A | Place B | Seat A | Seat D | Seat B | Seat C |
| 002 | 2019/06/11 | Place A | Place C | Seat D | Seat B | — | — |
| 001 | 2019/06/12 | Place D | Place A | Seat A | Seat B | Seat C | — |
| ... | ... | ... | ... | ... | ... | ... | ... |

FIG. 3

Vehicle information 14b

| Vehicle ID | Vehicle weight | Distance from center of gravity of vehicle weight to front axle | Distance from center of gravity of vehicle weight to rear axle | Distance from center of gravity of vehicle weight to left wheel center | Distance from center of gravity of vehicle weight to right wheel center |
|---|---|---|---|---|---|
| 001 | 1540 kg | 1.4 m | 1.2 m | 1.4 m | 1.2 m |
| 002 | 1280 kg | 1.2 m | 1.3 m | 1.2 m | 1.3 m |
| 003 | 1280 kg | 1.2 m | 1.3 m | 1.2 m | 1.3 m |
| ... | ... | ... | ... | ... | ... |

FIG. 4

Travel information 14c

| Vehicle ID | Time | Vehicle velocity | Steering angle | Estimated steering angle center value | Straight travel determination result |
|---|---|---|---|---|---|
| 001 | 2019/06/03 15:23:23.12 | 2.2 m/s | 0.24 deg. | -0.41 deg. | Straight |
| 001 | 2019/06/03 15:23:23.13 | 2.3 m/s | 0.27 deg. | -0.41 deg. | Straight |
| 001 | 2019/06/03 15:23:23.14 | 2.3 m/s | 0.31 deg. | -0.41 deg. | Turn |
| ... | ... | ... | ... | ... | ... |

FIG. 14

User information 214e

| | Vehicle 1 | | | | | Vehicle 2 | | | | | Vehicle 3 | | | | | Vehicle 4 | | | | |
|---|---|---|---|---|---|---|---|---|---|---|---|---|---|---|---|---|---|---|---|---|
| Name | ID | Sex | Age | Birthplace | Name | ID | Sex | Age | Birthplace | Name | ID | Sex | Age | Birthplace | Name | ID | Sex | Age | Birthplace |
| A | 005 | Male | 30s | A | B | 015 | Male | 30s | E | C | 122 | Male | 30s | O | H | 742 | Male | 30s | D |
| F | 012 | Female | 40s | G | E | 231 | Female | 40s | S | G | 241 | Female | 40s | K | O | 136 | Female | 40s | T |
| N | 102 | Male | 20s | D | D | 341 | Male | 20s | V | W | 653 | Male | 20s | R | K | 456 | Male | 20s | E |
| ... | ... | ... | ... | ... | ... | ... | ... | ... | ... | ... | ... | ... | ... | ... | ... | ... | ... | ... | ... |

FIG. 15

Environment information 214f

| Temperature | Humidity | Road condition | Wind direction | Wind speed |
|---|---|---|---|---|
| 21 °C | 50% | Dry | North | 3 m/s |
| 24 °C | 60% | Snow | Northeast | 1 m/s |
| 30 °C | 40% | Wet | North | 3 m/s |
| ... | ... | ... | ... | ... |

FIG. 17
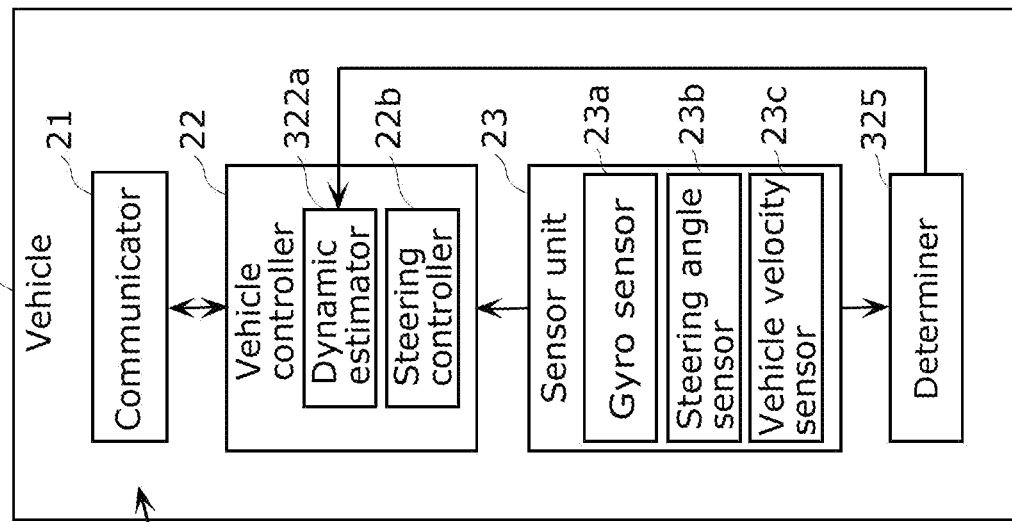
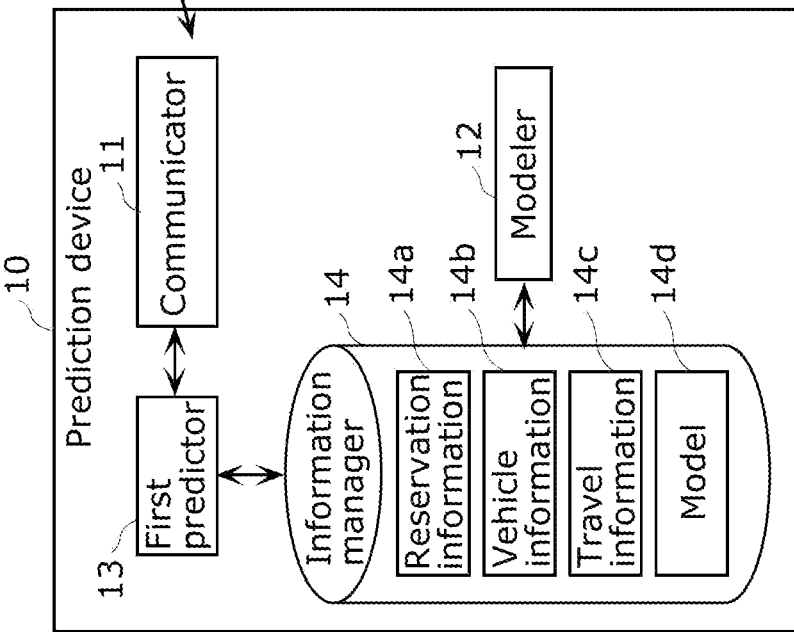

INFORMATION PROCESSING METHOD, INFORMATION PROCESSING SYSTEM, AND CONTROL DEVICE

CROSS REFERENCE TO RELATED APPLICATIONS

This is a continuation application of PCT International Application No. PCT/JP2020/047115 filed on Dec. 17, 2020, designating the United States of America, which is based on and claims priority of Japanese Patent Application No. 2019-234700 filed on Dec. 25, 2019. The entire disclosures of the above-identified applications, including the specifications, drawings and claims are incorporated herein by reference in their entirety.

FIELD

The present disclosure relates to an information processing method, an information processing system, and a control device for a moving body.

BACKGROUND

In recent years, various investigations of autonomous cars are being made. For example, in order to perform a travel control according to the position of the center of gravity of the autonomous car, investigations of devices that estimate the steering angle of the autonomous car are being made. Patent Literature (PTL) 1 discloses a device that estimates and corrects errors of a plurality of sensors including a steering angle sensor. Patent Literature (PTL) 2 discloses a steering angle detection device that estimates a zero correction value, which is a deviation from a steering angle neutral point, from the frequency of occurrence of steering angles during travel and corrects the steering angle value using the zero correction value.

CITATION LIST

Patent Literature

PTL 1: Japanese Patent No. 6383907
PTL 2: Japanese Unexamined Patent Application Publication No. 2017-105294

SUMMARY

Technical Problem

However, the devices according to PTLs 1 and 2 take time to set a reference value (referred to as a steering angle center, hereinafter) of the steering angle of the moving body. For example, in PTL 1, output values of a plurality of sensors including the steering angle sensor mounted on the vehicle are input, and errors of the output values are estimated. In PTL 2, steering angles detected during travel are accumulated, and the most frequent value or an average value is calculated as the steering angle center from the plurality of steering angles accumulated. Thus, the estimation of the steering angle center takes time to converge.

In view of this, an object of the present disclosure is to provide an information processing method, an information processing system, and a control device that can reduce the time required to set a steering angle center of a moving body.

Solution to Problem

In accordance with an aspect of the present disclosure, an information processing method executed by a computer includes: obtaining first transported-object information that is transported-object information including a position and a weight of a transported object on a moving body; obtaining a weight of the moving body; generating information indicating a predicted steering angle center value by inputting the first transported-object information obtained and the weight of the moving body obtained into a model generated using second transported-object information, a weight of the moving body, and a steering angle center value of the moving body, the second transported-object information being older transported-object information than the first transported-object information; and outputting the information indicating the predicted steering angle center value to the moving body.

In accordance with another aspect of the present disclosure, an information processing system includes: a first obtainer that obtains first transported-object information that is transported-object information including a position and a weight of a transported object on a moving body; a second obtainer that obtains a weight of the moving body; a generator that generates information indicating a predicted steering angle center value by inputting the first transported-object information obtained by the first obtainer and the weight of the moving body obtained by the second obtainer into a model generated using second transported-object information, a weight of the moving body, and a steering angle center value of the moving body, the second transported-object information being older transported-object information generated than the first transported-object information; and an outputter that outputs the information indicating the predicted steering angle center value to the moving body.

In accordance with still another aspect of the present disclosure, a control device provided to a moving body includes: a first obtainer that obtains first transported-object information that is transported-object information including a position and a weight of a transported object on a moving body; a second obtainer that obtains a weight of the moving body; a generator that generates information indicating a predicted steering angle center value by inputting the first transported-object information obtained by the first obtainer and the weight of the moving body obtained by the second obtainer into a model generated using second transported-object information, a weight of the moving body, and a steering angle center value of the moving body, the second transported-object information being older transported-object information than the first transported-object information; and setter that sets the predicted steering angle center value as a steering angle center value of the moving body.

Advantageous Effects

According to the information processing method according to an aspect of the present disclosure and the like, the time required to set the steering angle center of a moving body can be reduced.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a diagram illustrating an example of reservation information according to the embodiment.

FIG. 3 is a diagram illustrating an example of vehicle information according to the embodiment.

FIG. 4 is a diagram illustrating an example of travel information according to the embodiment.

FIG. 14 is a diagram illustrating an example of user information according to variation 2 of the embodiment.

FIG. 15 is a diagram illustrating an example of environment information according to variation 2 of the embodiment.

FIG. 17 is a block diagram illustrating a functional configuration of an information processing system according to variation 3 of the embodiment.

Figure 1:
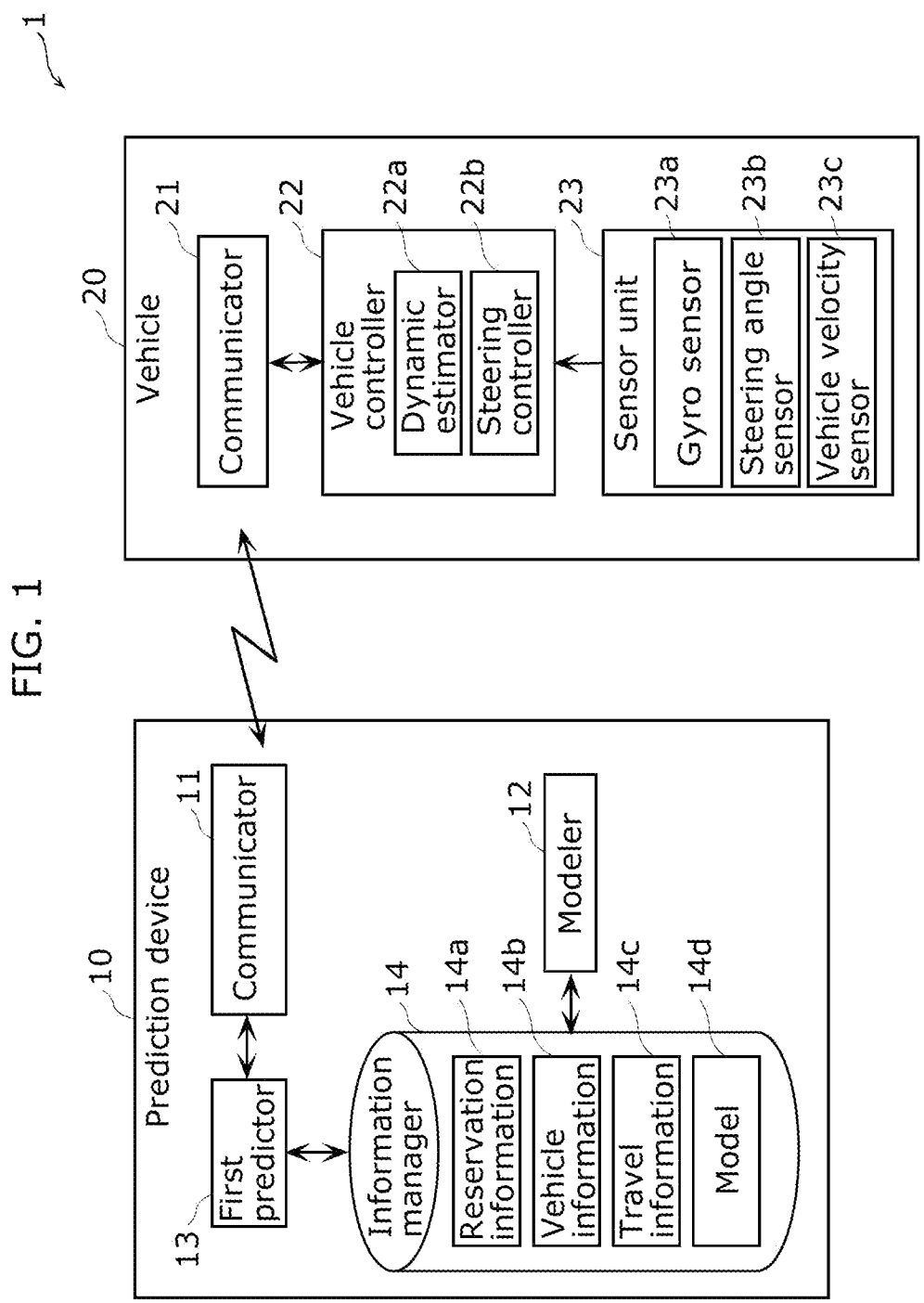
FIG. 1 is a block diagram illustrating a functional configuration of an information processing system according to an embodiment.

DESCRIPTION OF EMBODIMENTS (Findings on which Present Disclosure is Based)

In accordance with an aspect of the present disclosure, an information processing method executed by a computer includes: obtaining first transported-object information that is transported-object information including a position and a weight of a transported object on a moving body; obtaining a weight of the moving body; generating information indicating a predicted steering angle center value by inputting the first transported-object information obtained and the weight of the moving body obtained into a model generated using second transported-object information, a weight of the moving body, and a steering angle center value of the moving body, the second transported-object information being older transported-object information than the first transported-object information; and outputting the information indicating the predicted steering angle center value to the moving body.

According to the information processing method, the predicted steering angle center value (predicted value of steering angle center) can be generated using the model generated using past transported-object information or the like. That is, the moving body can set the steering angle center value without accumulating sensing data, such as steering angles, detected during travel. Therefore, according to the information processing method, the time required to set the steering angle center of the moving body can be reduced. Note that, since the predicted steering angle center value is generated using past transported-object information, a value close to the steering angle center value of the actual moving body with a transported object loaded thereon can be estimated. Therefore, the time required to set the steering angle center of the moving body can be reduced while reducing the decrease of the accuracy of the predicted steering angle center value (or in other words, while maintaining the accuracy).

Furthermore, for example, it is possible that the predicted steering angle center value is set to be an initial value of a steering angle center of the moving body during travel corresponding to the first transported-object information.

This allows the predicted steering angle center value to be set before travel of the moving body. By controlling the steering angle based on the predicted steering angle center value, the moving body can accurately control the steering angle immediately after starting running.

Furthermore, for example, it is possible that at least the position of the transported object included in the transported-object information is reservation information of the moving body, and the information indicating the predicted steering angle center value is generated after the reservation information is confirmed.

This allows the predicted steering angle center value to be generated using confirmed reservation information on the moving body. Since the reservation information is confirmed before travel, the predicted steering angle center value can be generated before travel.

Furthermore, for example, it is possible that at least one of the position or the weight of the transported object included in the transported-object information is determined based on output data of a weight sensor provided to the moving body.

This allows the actual position or weight of the transported object loaded on the moving body to be obtained from the output data of the weight sensor, so that the predicted steering angle center value can be more accurately generated.

Furthermore, for example, it is possible that at least one of the position or the weight of the transported object included in the transported-object information is determined based on a detection result of the transported object detected based on output data of an imaging sensor provided to the moving body.

This allows the actual position or weight of the transported object loaded on the moving body to be obtained from an image taken, so that the predicted steering angle center value can be more accurately generated.

Furthermore, for example, it is possible that the detection result includes an identification result of identifying the transported object, and at least one of the position or the weight of the transported object included in the transported-object information is determined based on attribute information of the transported object identified.

This allows the position or weight of the transported object to be determined based on attribute information of each transported object, so that the predicted steering angle center value can be more accurately generated.

Furthermore, for example, it is possible that the model is generated using a base model defined in advance.

Since a base model is determined in advance, a model can be generated only inputting predetermined information to the base model. That is, a model can be relatively easily generated.

Furthermore, for example, it is possible that the model is generated using a center of gravity of the moving body, the steering angle center value, and the base model, the center of gravity being calculated from the second transported-object information and the weight of the moving body.

This allows a model to be generated using the position of the center of gravity and the steering angle center value of the moving body that can be calculated from the transported-object information and the weight of the moving body.

Furthermore, for example, it is possible that the model is generated by machine learning using the second transported-object information and the weight of the moving body as training data and using the steering angle center value as reference data.

This allows generation of a model that is to be expected to be improved in prediction precision compared with a mathematical model designed in advance.

Furthermore, for example, it is possible that the model is generated using the training data that further includes attribute information of the transported object.

Since the model is generated by taking attribute information on the transported object into consideration, the model generated is further improved in prediction precision.

Furthermore, for example, it is possible that the model is generated using the training data that further includes environment information of the moving body.

Since the model is generated by taking environment information on the moving body into consideration, the model generated is further improved in prediction precision.

In accordance with another aspect of the present disclosure, an information processing system includes: a first obtainer that obtains first transported-object information that is transported-object information including a position and a weight of a transported object on a moving body; a second obtainer that obtains a weight of the moving body; a generator that generates information indicating a predicted steering angle center value by inputting the first transported-object information obtained by the first obtainer and the weight of the moving body obtained by the second obtainer into a model generated using second transported-object information, a weight of the moving body, and a steering angle center value of the moving body, the second transported-object information being older transported-object information generated than the first transported-object information; and an outputter that outputs the information indicating the predicted steering angle center value to the moving body.

In accordance with still another aspect of the present disclosure, a control device provided to a moving body includes: a first obtainer that obtains first transported-object information that is transported-object information including a position and a weight of a transported object on a moving body; a second obtainer that obtains a weight of the moving body; a generator that generates information indicating a predicted steering angle center value by inputting the first transported-object information obtained by the first obtainer and the weight of the moving body obtained by the second obtainer into a model generated using second transported-object information, a weight of the moving body, and a steering angle center value of the moving body, the second transported-object information being older transported-object information than the first transported-object information; and setter that sets the predicted steering angle center value as a steering angle center value of the moving body.

These have the same advantages as those of the information processing method described above.

It should be noted that general or specific aspects of the present disclosure may be implemented to a system, a device, a method, an integrated circuit, a computer program, a non-transitory computer-readable recording medium such as a Compact Disc-Read Only Memory (CD-ROM), or any given combination thereof.

Hereinafter, certain exemplary embodiments of the information processing method, the information processing system, and the control device according to aspects of the present disclosure will be described in detail with reference to the accompanying Drawings. The following embodiments are specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements. The elements in each of the embodiments may be combined.

It should be noted that the respective figures are schematic diagrams and are not necessarily precise illustrations. Therefore, the scales or the like applied in the figures are not necessarily unified. Additionally, components that are essentially the same share like reference signs in the figures. Accordingly, overlapping explanations thereof are omitted or simplified.

It should also be noted that the following description may include numerical values and numerical value ranges. However, such numerical values and numerical value ranges do not mean exact meanings only. They also mean the substantially same ranges including a difference of, for example, about several % from the completely same range.

Embodiment

In the following, an information processing method and the like according to an embodiment will be described with reference to FIG. 1 to FIG. 10.

[1. Configuration of Information Processing System]

First, a configuration of information processing system 1 according to this embodiment will be described with reference to FIG. 1 to FIG. 4. FIG. 1 is a block diagram illustrating a functional configuration of information processing system 1 according to this embodiment.

As illustrated in FIG. 1, information processing system 1 includes prediction device 10 and vehicle 20. Prediction device 10 and vehicle 20 are communicatively connected to each other via a network (not shown). Information processing system 1 is a prediction system that predicts a steering angle center value of vehicle 20. Vehicle 20 transports a passenger as a transported object.

Prediction device 10 performs processing for predicting a steering angle center value of vehicle 20. For example, prediction device 10 predicts a steering angle center value of vehicle 20 using reservation information (see FIG. 2 described later) of vehicle 20. Prediction device 10 is implemented by a server device, for example.

Prediction device 10 has communicator 11, modeler 12, first predictor 13, and information manager 14.

Communicator 11 allows prediction device 10 to communicate with vehicle 20. Communicator 11 is implemented by a communication circuit (communication module), for example. Communicator 11 outputs information indicating a steering angle center value generated by first predictor 13 to vehicle 20 via the network (not shown), and obtains a detection result from sensor unit 23 in vehicle 20, for example. In this way, communicator 11 serves as an output unit that outputs, to vehicle 20, information indicating steering angle center value generated by first predictor 13. Communicator 11 may also obtain travel information 14c from vehicle 20. In the following, a steering angle center value predicted by first predictor 13 will be referred to also as a predicted steering angle center value. Furthermore, generating a predicted steering angle center value (or in other words, predicting a steering angle center value) will be referred to also as predicting a predicted steering angle center value.

Communicator 11 also obtains various kinds of information, such as reservation information 14a or vehicle information 14b of vehicle 20, from an external device via the network. The various kinds of information obtained by communicator 11 are stored in information manager 14. The external device is not particularly limited and can be any device communicatively connected to prediction device 10. For example, the external device may be a smartphone of a passenger, a smart speaker, a personal computer, or a cloud server. Communicator 11 serves as a first obtainer that obtains reservation information 14a and serves as a second obtainer that obtains vehicle information 14b. reservation information 14a is an example of at least a position of a passenger of passenger information. Reservation information 14a may include a weight of a passenger of the passenger information. In this embodiment, reservation information 14a includes a position and a weight of a passenger of the passenger information. The passenger information is an example of transported-object information.

Modeler 12 generates model 14d for first predictor 13 to predict a predicted steering angle center value of vehicle 20 based on the various kinds of information stored in information manager 14. Modeler 12 generates model 14d using a base model defined in advance, for example. In this embodiment, modeler 12 generates model 14d using past reservation information 14a, a weight of vehicle 20, and an estimated steering angle center value during travel of vehicle 20 based on past reservation information 14a. Modeler 12 models a relationship between a steering angle center and a position of a center of gravity calculated from past reservation information 14a and a weight of vehicle 20. The base model is stored in information manager 14, for example.

In this embodiment, the base model is a linear regression model, and modeler 12 generates model 14d by regression analysis. Modeler 12 stores generated model 14d in information manager 14. Modeler 12 generates model 14d using past reservation information 14a. This allows modeler 12 to generate model 14d for predicting a predicted steering angle center value of vehicle 20 before travel of vehicle 20.

Modeler 12 may also generate model 14d for each vehicle 20. For example, modeler 12 may generate model 14d for each vehicle ID (see FIG. 2, for example) for identifying vehicle 20.

The generation of model 14d by modeler 12 will be described later. Past reservation information 14a means reservation information based on the content of which vehicle 20 moved (traveled) in the past. For example, reservation information 14a is referred to as past reservation information 14a if vehicle 20 has ever moved based on the reservation information and the traveling status of vehicle 20 during the movement was obtained. The traveling status includes at least the estimated steering angle center value or information that allows calculation of the estimated steering angle center value. Past reservation information 14a is an example of second passenger information. The second passenger information is past passenger information and, for example, is passenger information based on which vehicle 20 has ever moved. The second passenger information is an example of second transported-object information.

First predictor 13 predicts a predicted steering angle center value of vehicle 20 using model 14d generated by modeler 12. Specifically, first predictor 13 generates information indicating a predicted steering angle center value of vehicle 20 by inputting current reservation information 14a obtained via communicator 11 and a weight of vehicle 20 into model 14d. First predictor 13 predicts a predicted steering angle center value of vehicle 20 after current reservation information 14a is confirmed, for example. In other words, the predicted steering angle center value of vehicle 20 is predicted after current reservation information 14a is confirmed. First predictor 13 may also predict the predicted steering angle center value of vehicle 20 after current reservation information 14 is obtained and before a travel based on reservation information 14a is started, for example. That a travel based on reservation information 14a is started means that, provided that a travel corresponding to passenger information is to be started, a "time" included in reservation information 14a has come, and vehicle 20 starts moving with a passenger seated at a "passenger position". First predictor 13 is an example of a generator that generates information indicating a predicted steering angle center value, and current reservation information 14a is reservation information 14a based on the content of which vehicle 20 has not moved yet, and is an example of first passenger information. First passenger information is an example of first transported-object information.

First predictor 13 may predict a predicted steering angle center value before vehicle 20 starts moving based on the reservation content and output information indicating the predicted steering angle center value to vehicle 20, for example. By predicting a predicted steering angle center value using model 14d generated by modeler 12 before travel of vehicle 20, first predictor 13 can output information indicating the predicted steering angle center value to vehicle 20 before vehicle 20 starts running. In the following, predicting before vehicle 20 starts running will be referred to also as predicting in advance.

First predictor 13 is not limited to predicting a predicted steering angle center value in advance. First predictor 13 may predict a predicted steering angle center value after vehicle 20 starts running and output the predicted steering angle center value to vehicle 20. In that case, first predictor 13 can predict a predicted steering angle center value immediately after vehicle 20 starts running and output the predicted steering angle center value to vehicle 20.

First predictor 13 outputs the predicted steering angle center value to vehicle 20 via communicator 11.

Information manager 14 stores various kinds of information obtained via communicator 11, and model 14*d* for first predictor 13 to predict a predicted steering angle center value. Specifically, information manager 14 stores reservation information 14*a*, vehicle information 14*b*, travel information 14*c*, and model 14*d*.

Reservation information 14*a* includes a content of a reservation of vehicle 20 made by a user. Reservation information 14*a* includes "vehicle ID", "time", "place of departure", "place of destination", and "passenger position", for example, as shown in FIG. 2. FIG. 2 is a diagram illustrating an example of reservation information 14*a* according to this embodiment. Note that FIG. 2 illustrates reservation information 14*a* in the case where vehicle 20 is a four-seater vehicle.

"Vehicle ID" is identification information for identifying vehicle reserved by a user. "Vehicle ID" may be a numerical value or a symbol for identifying vehicle 20, or may be a model name.

"Time" indicates a date or a time of day when vehicle 20 is to be used.

"Place of departure" and "place of destination" indicate a place where a passenger gets on vehicle 20 and a place where a passenger gets off vehicle 20.

"Passenger position" indicates a position in vehicle 20 of a passenger who gets on vehicle 20. Seats A to D mean seats in vehicle 20. Referring to the case where "vehicle ID" is 002, for example, the total number of passengers is two, user 1 who is a passenger has reserved seat D, and user 2 who is a passenger has reserved seat B. For example, user 1 is a passenger who will sit in seat D, which is a front left seat, and user 2 is a passenger who will sit in seat B, which is a rear left seat. "Passenger position" also includes information for identifying the weight of each user. The information for identifying the weight of a user may be the weight of the user or information that allows estimation of the weight of the user, such as age or sex.

As described above, reservation information 14*a* includes the position and the weight of the passenger in vehicle 20. When reservation information 14*a* does not include the weight of the passenger, the weight of the passenger set in advance may be used. The weight of the passenger may be calculated using the information for identifying the weight described above and obtained as passenger information.

Information manager 14 may store a program to be executed by a processing unit (such as modeler 12 or first predictor 13) of prediction device 10 or information used for executing the program, for example. The information used for executing the program includes the base model, for example. For example, information manager 14 is implemented by a storage device, such as a semiconductor memory.

Vehicle information 14*b* includes information for calculating the position of the center of gravity of vehicle 20. Vehicle information 14B includes "vehicle ID", "vehicle weight", "distance from center of gravity of vehicle weight to front axle", "distance from center of gravity of vehicle weight to rear axle", "distance from center of gravity of vehicle weight to left wheel center", and "distance from center of gravity of vehicle weight to right wheel center", for example, as shown in FIG. 3. FIG. 3 is a diagram illustrating an example of vehicle information 14*b* according to this embodiment.

"Vehicle ID" is identification information for identifying vehicle 20 reserved by a user. For the same vehicle 20, "vehicle ID" in vehicle information 14*b* is the same ID as "vehicle ID" in reservation information 14*a*. This allows modeler 12 to obtain, from vehicle information 14*b*, information for generating model 14*d* suitable for vehicle 20 reserved in reservation information 14*a*.

"Vehicle weight" indicates the weight of vehicle 20 itself. That is, "vehicle weight" indicates the weight of vehicle 20 with no person on it.

"Distance from center of gravity of vehicle weight to front axle" indicates the distance from the center of the vehicle weight of vehicle 20 with no person on it to the front axle. "Distance from center of gravity of vehicle weight to rear axle" indicates the distance from the center of the vehicle weight of vehicle 20 with no person on it to the rear axle. "Distance from center of gravity of vehicle weight to center of left wheel center" indicates the distance from the center of the vehicle weight of vehicle 20 with no person on it to the left wheel center. "Distance from center of gravity of vehicle weight to right wheel center" indicates the distance from the center of the vehicle weight of vehicle 20 with no person on it to the right wheel center. Note that the left wheel center is the center of a straight line connecting wheels disposed on the left side or, more specifically, the center of a straight line connecting the left front wheel and the left rear wheel. The right wheel center is the center of a straight line connecting wheels disposed on the right side or, more specifically, the center of a straight line connecting the right front wheel and the right rear wheel.

Vehicle information 14*b* may include information indicating the position of the center of gravity of vehicle 20.

Vehicle information 14*b* may be obtained from an external device via communicator 11, or may be obtained from vehicle 20 if vehicle 20 stores vehicle information 14*b*.

Travel information 14*c* includes information indicating a travel history of vehicle 20 having traveled based on reservation information 14*a*. Travel information 14*c* is generated based on a sensing result from various sensors mounted on vehicle 20, for example. Travel information 14*c* includes "vehicle ID", "time", "vehicle velocity", "steering angle", "estimated steering angle center value", and "straight travel determination result", for example, as shown in FIG. 4. FIG. 4 is a diagram illustrating an example of travel information 14*c* according to this embodiment.

"Vehicle ID" is identification information for identifying vehicle 20 for which a sensing result is obtained. "Vehicle ID" in travel information 14*c* is the same ID as "vehicle ID" in reservation information 14*a*, for example. This allows modeler 12 to obtain, from travel information 14*c*, information for generating model 14*d* suitable for vehicle 20 reserved in current reservation information 14*a*.

"Time" indicates the time at which sensor unit 23 performs sensing during travel of vehicle 20. Although sensor unit 23 performs sensing at intervals of 1 second in the example shown, the present disclosure is not limited to this. Although each of various sensors of sensor unit 23 performs sensing at intervals of 1 second in the example shown, the present disclosure is not limited to this.

"Vehicle velocity" indicates the velocity of vehicle 20 at each time of sensing. "Vehicle velocity" is a sensing result of vehicle velocity sensor 23c, for example.

"Steering angle" indicates the steering angle of vehicle 20 each time of sensing. "Steering angle" is a sensing result of steering angle sensor 23b, for example.

"Estimated steering angle center value" indicates an estimated value of a steering angle center calculated for vehicle 20 at each time of sensing. "Estimated steering angle center value" indicates an estimation result of dynamic estimator 22a, for example.

"Straight travel determination result" indicates a determination result of whether vehicle 20 is traveling straight or not at each time of sensing. "Straight travel determination result" is included when information processing system 1 includes a determiner (not illustrated in FIG. 1) that determines whether vehicle 20 is traveling straight or not, for example. "Straight travel determination result" need not be included in travel information 14c.

Travel information 14c is obtained from vehicle 20 via communicator 11, for example. Travel information 14c may be obtained as required during travel of vehicle 20 based on reservation information 14a or may be obtained after travel of vehicle 20 based on reservation information 14a. Travel information 14c is stored in association with reservation information 14a at the time when travel information 14c is obtained. In other words, information manager 14 stores reservation information 14a and travel information 14c obtained during travel of vehicle 20 based on reservation information 14a linked to each other.

Referring back to FIG. 1, model 14d is a mathematical model for predicting a predicted steering angle center value of vehicle 20 generated by modeler 12. Model 14d may be generated for each vehicle 20, for example. In that case, information manager 14 may store a vehicle ID and model 14d suitable for vehicle 20 corresponding to the vehicle ID in association with each other. This allows first predictor 13 to obtain, based on the vehicle ID included in reservation information 14a, model 14d associated with the vehicle ID from information manager 14.

Vehicle 20 is an example of a moving body on which a user gets. Vehicle 20 is supposed to be an autonomous car that controls driving of the vehicle without operations by the driver. However, vehicle 20 may be a vehicle capable of switching between autonomous driving and manual driving, or a vehicle capable of only manual driving. In the case of a vehicle capable of only manual driving, the predicted steering angle center value is used for driving assistance processing for supporting the manual driving.

Vehicle 20 has communicator 21, vehicle controller 22, and sensor unit 23.

Communicator 21 allows vehicle 20 to communicate with prediction device 10. Communicator 21 is implemented by a communication circuit (communication module), for example. Communicator 21 obtains a predicted steering angle center value from prediction device 10 via the network (not shown), and outputs a sensing result of sensor unit 23 or the like to prediction device 10.

Vehicle controller 22 controls traveling of vehicle 20. In this embodiment, vehicle controller 22 controls steering of vehicle 20 based on the predicted steering angle center value obtained from prediction device 10. Vehicle controller 22 has dynamic estimator 22a and steering controller 22b. Vehicle controller 22 also controls acceleration, deceleration and the like, in addition to steering.

Dynamic estimator 22a estimates a steering angle center value during travel of vehicle 20. In other words, dynamic estimator 22a generates an estimated steering angle center value. Dynamic estimator 22a sets the predicted steering angle center value obtained from prediction device 10 as the steering angle center value of vehicle 20. For example, dynamic estimator 22a sets the predicted steering angle center value as an initial value of the steering angle center of vehicle 20 before travel, and estimates the steering angle center value during travel of vehicle 20. Dynamic estimator 22a estimates the steering angle center value during travel of vehicle 20 by Kalman filter processing, for example. The steering angle center value may be expressed as a relative value, such as a difference from a reference value, or may be expressed as an absolute value. The processing by dynamic estimator 22a will be described later. Dynamic estimator 22a is an example of a setter.

Steering controller 22b controls steering of vehicle 20 based on the estimation result of dynamic estimator 22a. For example, steering controller 22b drives a steering motor based on the estimation result of dynamic estimator 22a to change the angle of a wheel (the front wheels, for example) with respect to the vehicle body. Furthermore, steering controller 22b changes the angle of a wheel based on the degree of depression of the accelerator pedal, the degree of depression of the brake pedal, the vehicle velocity, the vehicle angular velocity, and the like.

Vehicle controller 22 may output a detection result obtained from sensor unit 23 to prediction device 10 via communicator 21.

Sensor unit 23 detects the traveling status of vehicle 20. Sensor unit 23 has one or more sensors capable of detecting the status of vehicle 20 during travel, and has gyro sensor 23a, steering angle sensor 23b, and vehicle velocity sensor 23c, for example.

Gyro sensor 23a is a sensor that detects at least an angular velocity involved with a rotation about a vertical axis (a rotation in a yaw direction, such as a rotation in a Z-axis direction in FIG. 7A described later), that is, an angular velocity involved with a rotation (turning) in a lateral direction of vehicle 20. Gyro sensor 23a may be a sensor that detects angular velocities involved with rotations about three axes in different directions of vehicle 20 including the vertical axis.

Steering angle sensor 23b is a sensor that detects a steering angle.

Vehicle velocity sensor 23c is a sensor that detects a vehicle velocity of vehicle 20. Vehicle velocity sensor 23c may detects the number of revolutions per unit time of an axle and determine the vehicle velocity of vehicle 20 based on the detected number of revolutions.

The various sensors of sensor unit 23 output the detection results to vehicle controller 22. The various sensors may perform detection in synchronization, or each sensor may perform detection at predetermined time intervals.

Sensor unit 23 may have a sensor other than those described above for detecting the traveling status of vehicle 20. For example, sensor unit 23 may have a camera that takes images of the inside or outside of vehicle 20, an acceleration sensor that detects the acceleration of vehicle 20, a global positioning system (GPS) receiver that detects the location of vehicle 20, and the like.

As described above, information processing system 1 according to this embodiment includes modeler 12 that generates model 14d for predicting a predicted steering angle center value of vehicle 20 using past reservation information 14a or the like, model 14d generated by modeler 12, first predictor 13 that predicts a predicted steering angle center value of vehicle 20 using current reservation information 14a and vehicle information 14b, and communicator 11 that outputs the predicted steering angle center value to vehicle 20.

Thus, information processing system 1 can generate a predicted steering angle center value using model 14d generated using past reservation information 14a or the like. Since the predicted steering angle center value is output to vehicle 20 via communicator 11, vehicle 20 can estimate a steering angle center value using the obtained predicted steering angle center value. For example, vehicle 20 can estimate a steering angle center value using the predicted steering angle center value without accumulating steering angles detected during travel. Therefore, according to the information processing method, the time required before estimating the steering angle center of vehicle 20 can be reduced.

Dynamic estimator 22a of vehicle 20 may set the predicted steering angle center value as an initial value of the steering angle center before travel in a travel corresponding to first passenger information of the vehicle.

This allows dynamic estimator 22a to predict a steering angle center value before the vehicle starts traveling, the operating vehicle velocity immediately after the vehicle starts running can be improved. For example, dynamic estimator 22a can estimate the steering angle center in real time immediately after the vehicle starts running.

[2. Operation of Information Processing System]

Figure 5:
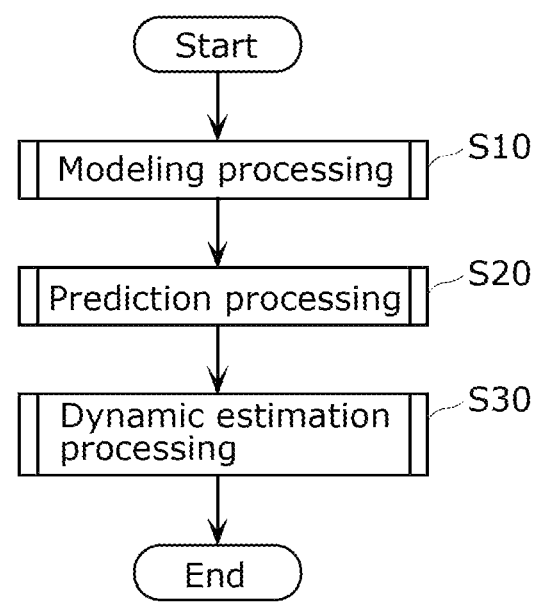
FIG. 5 is a flowchart illustrating an operation of the information processing system according to the embodiment.

Next, an operation of information processing system 1 described above will be described with reference to FIG. 5 to FIG. 10. FIG. 5 is a flowchart illustrating an operation of information processing system 1 according to this embodiment.

As illustrated in FIG. 5, information processing system 1 first performs modeling processing (S10). The modeling processing is processing for generating model 14d for predicting the predicted steering angle center value of vehicle 20. Once reservation information 14a is confirmed, information processing system 1 perform prediction processing (S20). The prediction processing is processing performed after current reservation information 14a is obtained, and is processing for predicting the predicted steering angle center value of vehicle 20 using model 14d, current reservation information 14a, and vehicle information 14b. For example, in the prediction processing, the predicted steering angle center value of vehicle 20 is predicted using model 14d, the passenger position and weight of the user, and the weight of vehicle 20. After the predicted steering angle center value is predicted, when vehicle 20 starts traveling, information processing system 1 performs dynamic estimation processing (S30). The dynamic estimation processing is processing for estimating the steering angle center of vehicle 20 during travel by setting the predicted steering angle center value predicted in step S20 as an initial value. In the dynamic estimation processing, the steering angle center value is repeatedly estimated while vehicle 20 is traveling, for example.

The timing when the processing of step S20 is performed is not particularly limited and can be any timing after the modeling processing is performed and before the travel based on reservation information 14a occurs.

Figure 6:
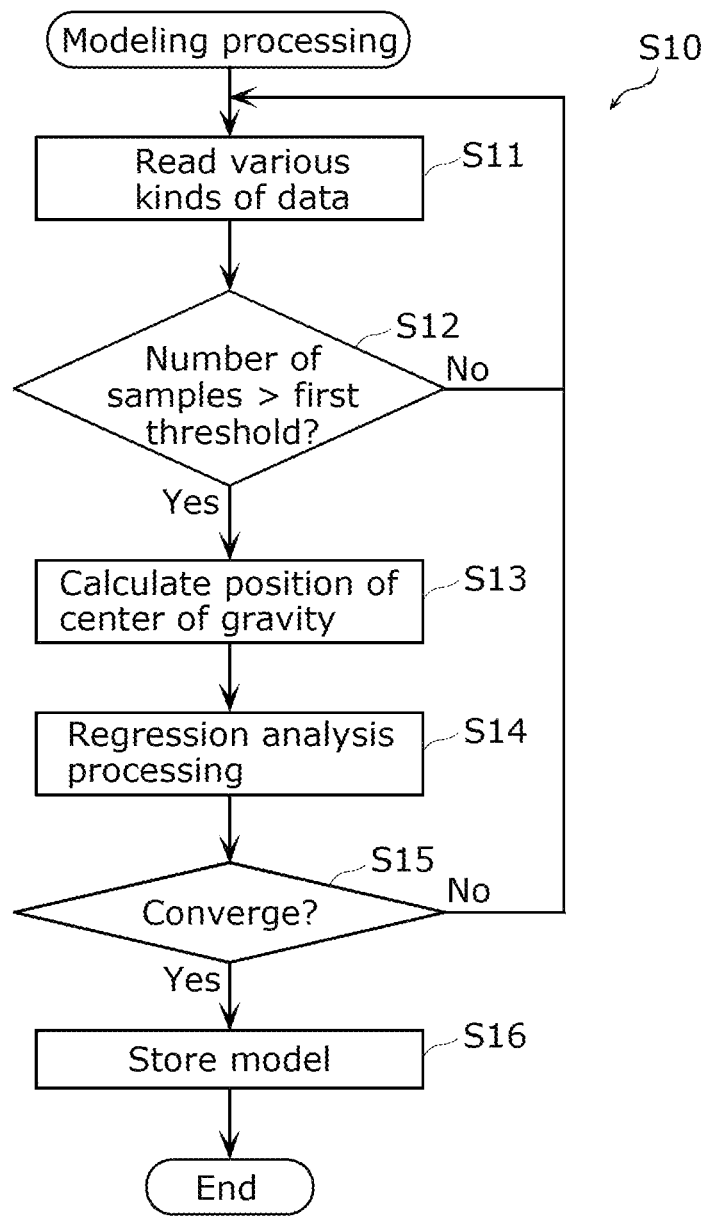
FIG. 6 is a flowchart illustrating details of modeling processing according to the embodiment.

Next, the modeling processing, the prediction processing, and the dynamic estimation processing will be described with reference to FIG. 6 to FIG. 10. First, the modeling processing will be described with reference to FIG. 6 to FIG. 7C. FIG. 6 is a flowchart illustrating details of the modeling processing (S10) according to this embodiment. The processing illustrated in FIG. 6 is performed by modeler 12.

As illustrated in FIG. 6, in the modeling processing (S10), modeler 12 reads various kinds of data from information manager 14 (S11). Modeler 12 reads past reservation information 14a, vehicle information 14b, and travel information 14c from information manager 14, for example.

Modeler 12 then determines whether the number of samples of the various kinds of read data is greater than a first threshold (S12). In step S12, modeler 12 determines whether there is a sufficient number of samples of data to generate model 14d. The first threshold is not particularly limited and can be any number of samples that allows modeler 12 to generate model 14d. The number of samples may be defined as the number of sets of reservation information 14a and travel information 14c for one vehicle ID, provided that one set of reservation information 14a and travel information 14c is a set of reservation information 14a and travel information 14c linked to each other. Alternatively, the number of samples may be a cumulative time for which travel information 14c for one vehicle ID is obtained. Modeler 12 may determine that the number of samples is greater than the first threshold when the cumulative time for which travel information 14c is obtained is more than a predetermined time. By performing the determination in step S12, modeler 12 can generate model 14d using travel information 14c in various cases.

When it is determined that the number of samples is greater than the first threshold (if Yes in S12), modeler 12 calculates the position of the center of gravity (S13). Modeler 12 calculates the position of the center of gravity of vehicle 20 with a passenger on it (referred to as vehicle 20 with a passenger, hereinafter) using past reservation information 14a and vehicle information 14b. Specifically, modeler 12 calculates the position of the center of gravity of vehicle 20 with a passenger using the passenger position and the weight of the passenger and the position of the center of gravity and the weight of vehicle 20.

Here, the calculation of the position of the center of gravity of vehicle 20 with a passenger will be described with reference to FIG. 7A to FIG. 7C. FIG. 7A is a schematic top view of vehicle 20, which is a first diagram for describing the calculation of the position of the center of gravity of vehicle 20 with a passenger. FIG. 7B is a schematic rear view of vehicle 20, which is a second diagram for describing the calculation of the position of the center of gravity of vehicle 20 with a passenger. FIG. 7C is a schematic side view of vehicle 20, which is a third diagram for describing the calculation of the position of the center of gravity of vehicle 20 with a passenger.

Figure 7A:
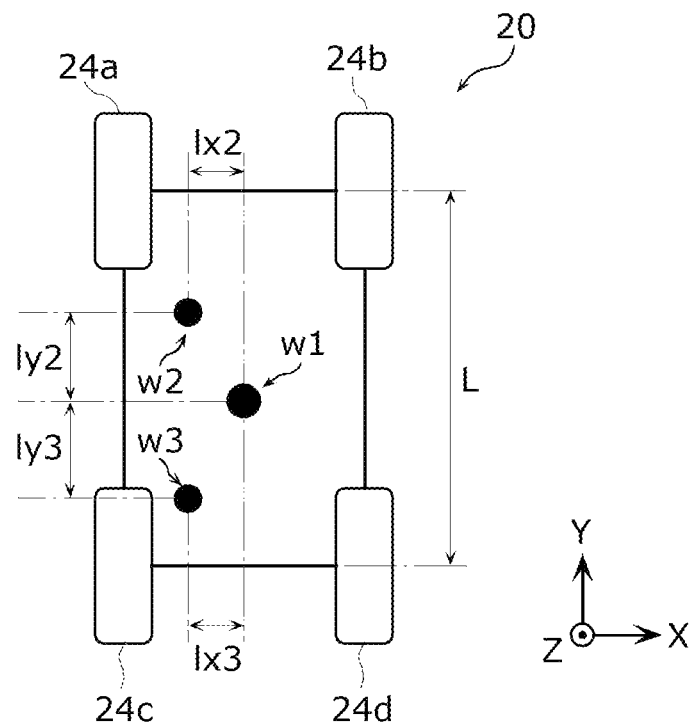
FIG. 7A is a first diagram for describing calculation of the amount of displacement of the position of the center of gravity of a vehicle.
Figure 7B:
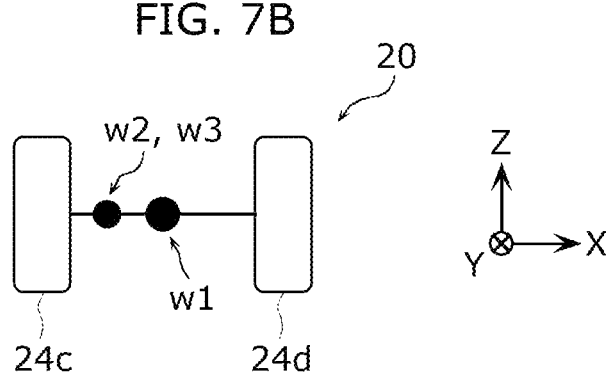
FIG. 7B is a second diagram for describing calculation of the amount of displacement of the position of the center of gravity of a vehicle.
Figure 7C:
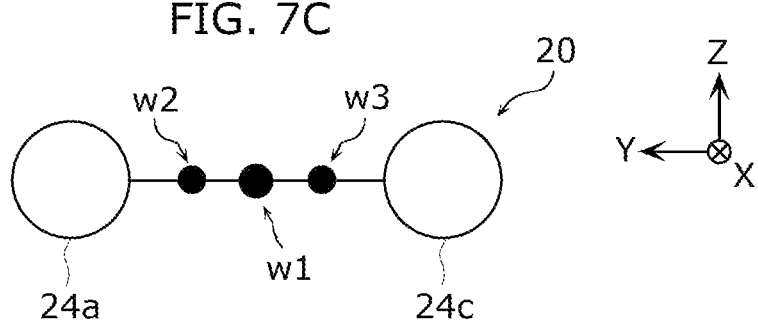
FIG. 7C is a third diagram for describing calculation of the amount of displacement of the position of the center of gravity of a vehicle.

FIG. 7A to FIG. 7C illustrate front wheels 24a and 24b and rear wheels 24c and 24d of vehicle 20. A Y axis indicates the longitudinal direction of vehicle 20, an X axis indicates the lateral direction of vehicle 20, and a Z axis indicates the height direction of vehicle 20.

With reference to FIG. 7A to FIG. 7C, a case will be described where the position of the center of gravity of vehicle 20 is calculated when there are passengers sitting in the front left seat and the rear left seat. Vehicle center w1 indicates the position of the center of gravity of vehicle 20 with no person on it. Passenger's center of gravity w2 indicates the position of the center of gravity of the passenger (user 1 illustrated in FIG. 2, for example) sitting in the front left seat. Passenger's center of gravity w3 indicates the position of the center of gravity of the passenger (user 2 illustrated in FIG. 2, for example) sitting in the rear left seat.

As illustrated in FIG. 7A to FIG. 7C, passenger's center of gravity w2 and passenger's center of gravity w3 are expressed as (Ix2, Iy2) and (Ix3, Iy3), respectively, in the XY plane with vehicle center w1 as an origin.

Provided that the weight of vehicle 20 is m1, the weight of the passenger sitting in the front left seat is m2, and the weight of the passenger sitting in the rear left seat is m3, the position (Ix, Iy) of the center of gravity of vehicle 20 with the two passengers on it is calculated according to the following Equation 1 and Equation 2.

$$Ix=(Ix2\times m2+Ix3\times m3)/(m1+m2+m3) \quad \text{(Equation 1)}$$

$$Iy=(Iy2\times m2+Iy3\times m3)/(m1+m2+m3) \quad \text{(Equation 2)}$$

Modeler 12 calculates the position (Ix, Iy) of the center of gravity described above according to Equation 1 and Equation 2 for each piece of past reservation information 14a of vehicle 20. In this way, a plurality of positions (Ix, Iy) of the center of gravity are calculated for vehicle 20 with the same vehicle ID.

Referring back to FIG. 6, modeler 12 generates model 14d by performing regression analysis processing using the calculated position (Ix, Iy) of the center of gravity and the estimated steering angle center value obtained (S14). Modeler 12 plots a plurality of points (point cloud) on an xyz coordinate system indicating Ix in the calculated position (Ix, Iy) of the center of gravity on the x axis, Iy in the calculated position (Ix, Iy) of the center of gravity on the y axis, and the steering angle center value δ at the time of calculation of the positions Ix and Iy on the z axis and performs plane fitting using the least square method, thereby calculating coefficients a, b, and c of the following Equation 3. That is, the position (Ix, Iy) of the center of gravity and the steering angle center value δ are used as input information for generating model 14d.

$$a\times Ix+b\times Iy+c=\delta \quad \text{(Equation 3)}$$

As the steering angle center value δ, the estimated steering angle center value of travel information 14c is used, for example. This allows modeler 12 to calculate coefficients a, b, and c appropriate to vehicle 20 of each vehicle ID. Such as calculation of the coefficients a, b, and c by the regression analysis (such as linear regression analysis) is an example of the generation of model 14d. Equation 3 is an example of the base model defined in advance. Step S14 is a step of generating model 14d, in which model 14d is generated using a base model defined in advance.

In this way, model 14d is generated using the position (Ix, Iy) of the center of gravity of vehicle 20 calculated from past reservation information 14a and vehicle information 14b, the estimated steering angle center value, and the base model, for example.

Modeler 12 then determines whether the regression analysis converges (S15). For example, modeler 12 determines whether the regression analysis converges by determining whether or not the error of the least square method is equal to or less than a certain value. For example, modeler 12 determines whether or not a sum of the squares of the distances between the points of the point cloud and the plane defined by the coefficients a, b, and c is equal to or smaller than a predetermined value. The predetermined value is set in advance.

When the regression analysis converges (if Yes in S15), modeler 12 stores model 14d generated in step S14 in information manager 14 (S16). In other words, modeler 12 stores the coefficients a, b, and c in Equation 3 in information manager 14.

When the number of samples is equal to or smaller than the first threshold (if No in S12), and when the regression analysis does not converge (if No in S15), modeler 12 returns to step S11 and continues the processing.

The process in which modeler 12 calculates the coefficients a, b, and c is not limited to the process using the least square method, and any existing process can be used. The base model is not limited to the model represented by Equation 3, and any model used for regression analysis can be used.

Figure 8:
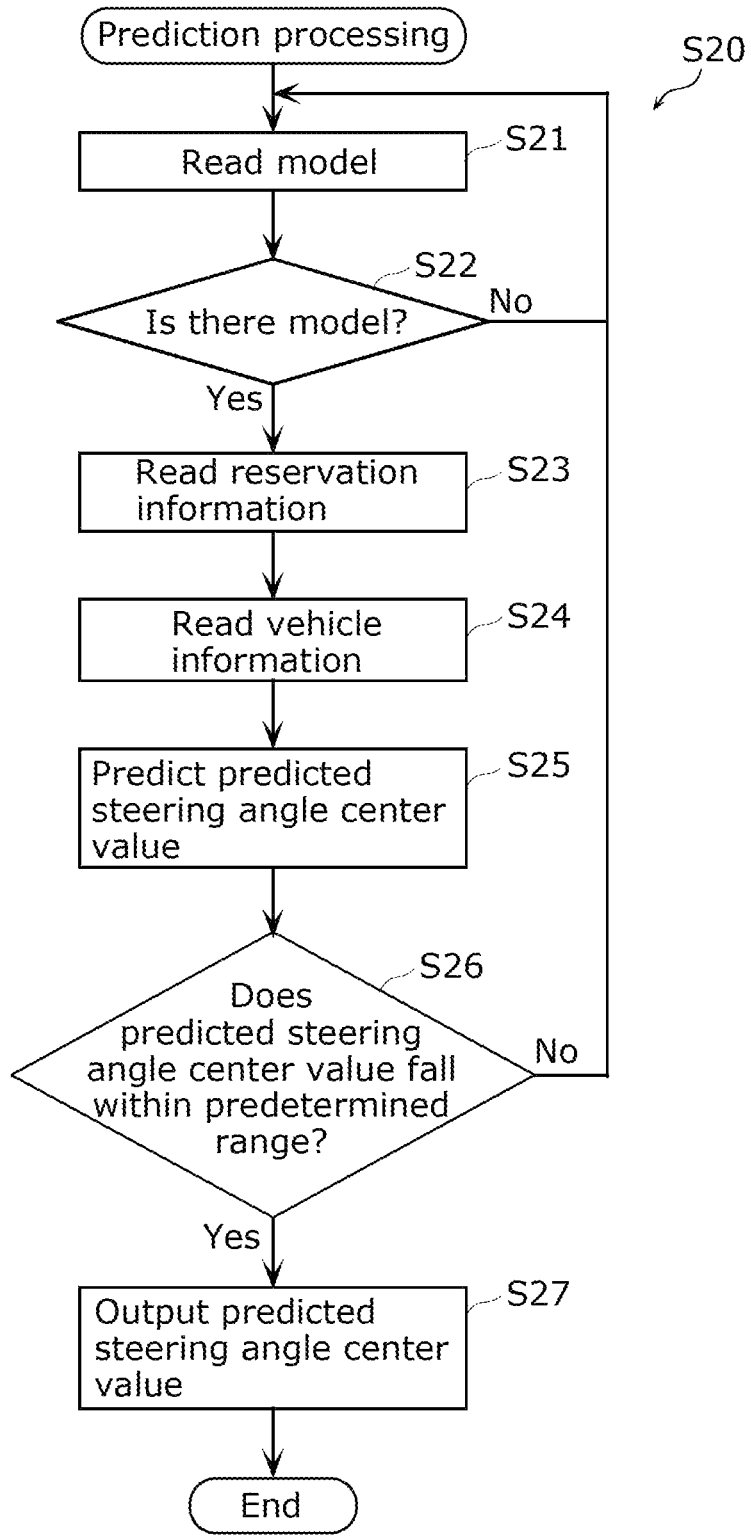
FIG. 8 is a flowchart illustrating details of prediction processing according to the embodiment.

Next, the prediction processing will be described with reference to FIG. 8. FIG. 8 is a flowchart illustrating details of the prediction processing (S20) according to this embodiment. The processing illustrated in FIG. 8 is performed by first predictor 13, for example. The processing illustrated in FIG. 8 is performed after current reservation information 14a is obtained via communicator 11.

As illustrated in FIG. 8, in the prediction processing (S20), first predictor 13 performs processing for reading model 14d from information manager 14, and determines whether there is model 14d (S22). For example, first predictor 13 determines whether there is model 14d suitable for vehicle 20. Specifically, first predictor 13 determines whether there is model 14d for vehicle 20 of a predetermined vehicle ID, for example. The predetermined vehicle ID is a vehicle ID included in current reservation information 14a obtained via communicator 11, for example. That is, the predetermined vehicle ID is a vehicle ID of vehicle 20 for which the predicted steering angle center value is to be predicted.

When there is model 14d (if Yes in S22), first predictor 13 reads model 14d from information manager 14. Specifically, first predictor 13 reads the coefficients a, b, and c in Equation 3, which is a base model, from information manager 14.

First predictor 13 then reads reservation information 14a (S23). First predictor 13 reads current reservation information 14a from information manager 14, for example. Step S23 is performed to obtain the position and the weight of any passenger in vehicle 20. Step S23 is an example of obtaining first passenger information.

First predictor 13 then reads vehicle information 14b (S24). For example, first predictor 13 reads vehicle information 14b of the vehicle ID included in current reservation information 14a from information manager 14. Step S24 is performed to obtain the weight of vehicle 20. Step S24 is an example of obtaining the weight of vehicle 20.

First predictor 13 then predicts the predicted steering angle center value of vehicle 20 using read model 14d (S25). First predictor 13 calculates the position (Ix, Iy) based on current reservation information 14a and Equations 1 and 2, and substitutes the calculated position (Ix, Iy) of the center of gravity into Equation 3. In this way, the steering angle center δ is calculated. The steering angle center δ calculated in step S25 is an example of the predicted steering angle center value. Step S25 is an example of generating the predicted steering angle center value.

First predictor 13 then determines whether the predicted steering angle center value predicted in step S25 falls within a predetermined range (S26). The predetermined range can be any range that allows determination of whether the predicted steering angle center value falls within a range of practically possible values, for example, and is set in advance. When the predicted steering angle center value falls within the predetermined range (if Yes in S26), first predictor 13 outputs the predicted steering angle center value to vehicle 20 (S27). For example, first predictor 13 outputs the predicted steering angle center value of the steering center predicted in step S25 to vehicle 20 identified by the vehicle ID included in current reservation information 14a, for example. Step S27 is an example of outputting information indicating the predicted steering angle center value to vehicle 20.

When there is no model 14d (if No in S22), and when the predicted steering angle center value is outside the predetermined range (if No in S26), first predictor 13 returns to step S21, and continues the processing.

First predictor 13 can perform the prediction processing (S20) before the travel of vehicle 20 based on current reservation information 14a occurs. For example, based on "time" in current reservation information 14a, first predictor 13 may perform the prediction processing (S20) before "time" elapses.

Figure 9:
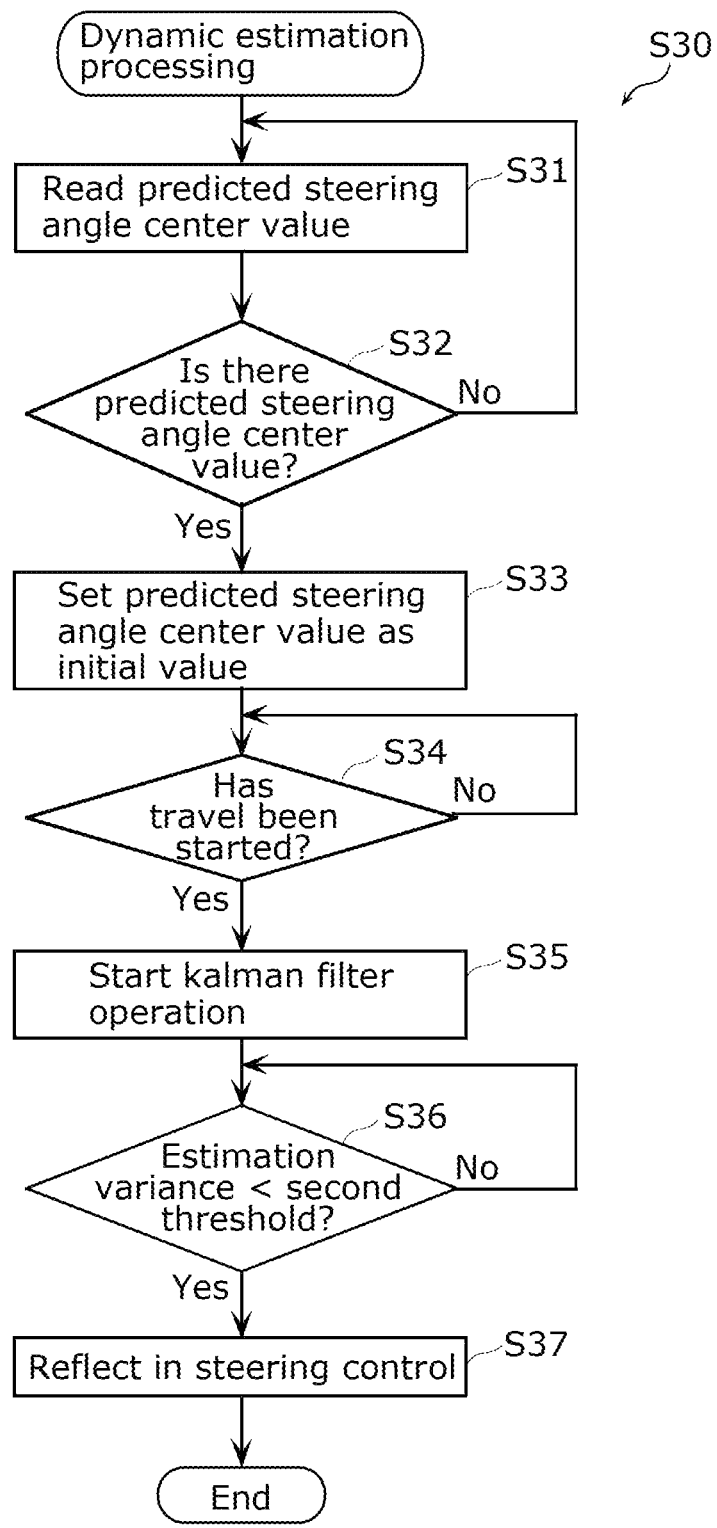
FIG. 9 is a flowchart illustrating details of dynamic estimation processing according to the embodiment.

Next, the dynamic estimation processing will be described with reference to FIG. 9 and FIG. 10. FIG. 9 is a flowchart illustrating details of the dynamic estimation processing (S30) according to this embodiment. The processing illustrated in FIG. 9 is performed by dynamic estimator 22a of vehicle 20, for example. The processing illustrated in FIG. 9 is performed after vehicle 20 obtains the predicted steering angle center value from prediction device 10.

As illustrated in FIG. 9, in the dynamic estimation processing (S30), dynamic estimator 22a performs processing for reading, from a storage device (not shown) provided to vehicle 20, the predicted steering angle center value of the steering center obtained from prediction device 10 and stored in the storage device (S31), and determines whether there is a predicted steering angle center value (S32). When there is a predicted steering angle center value (if Yes in S32), dynamic estimator 22a reads the predicted steering angle center value, and sets the read predicted steering angle center value as an initial value for the dynamic estimation processing (S33). When there is a plurality of predicted steering angle center values, dynamic estimator 22a sets the latest predicted steering angle center value as an initial value for the dynamic estimation processing. When there is no predicted steering angle center value (if No in S32), dynamic estimator 22a returns to step S31, and continues the processing.

Dynamic estimator 22a then determines whether vehicle 20 has started traveling based on detection results from various sensors (S34). For example, dynamic estimator 22a determines whether vehicle 20 has started traveling based on a detection result from vehicle velocity sensor 23c. When vehicle 20 has started traveling (if Yes in S34), dynamic estimator 22a starts an operation of the Kalman filter in order to estimate the steering angle center of vehicle 20 during travel in real time (S35). That is, dynamic estimator 22a estimates the steering angle center value of the vehicle during travel by estimation processing using the Kalman filter. The operation of the Kalman filter will be described later. When vehicle 20 has not started traveling (if No in S34), dynamic estimator 22a returns to step S34, and continues the processing.

Dynamic estimator 22a then determines whether an estimation variance (variance value) is smaller than a second threshold (S36). Dynamic estimator 22a calculates a variance (variance value) of the steering angle center value estimated using the Kalman filter, and determines whether the calculated variance value is smaller than the second threshold. The variance value corresponds to variance value P calculated according to Equation 13 described later. When variance value P is smaller than the second threshold (if Yes in S36), dynamic estimator 22a reflects the estimated steering angle center value in the steering control (S37). Specifically, dynamic estimator 22a outputs the estimated steering angle center value to steering controller 22b. Steering controller 22b performs control of the steering angle of the vehicle using the steering angle center value estimated by dynamic estimator 22a.

Here, the operation of the Kalman filter and the like will be described with reference to FIG. 10. FIG. 10 is a diagram for describing an operation of an extended Kalman filter according to this embodiment. The extended Kalman filter according to this embodiment is a filter for estimating a bias (steering angle bias δb) of the steering angle.

Figure 10:
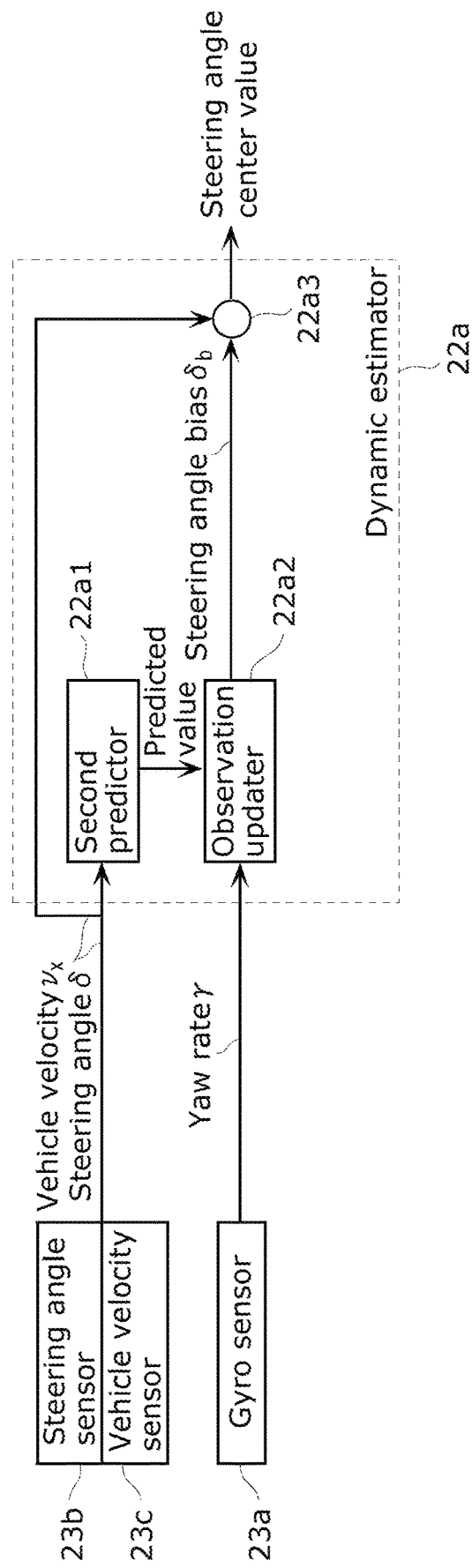
FIG. 10 is a diagram for describing an operation of a Kalman filter according to the embodiment.

As illustrated in FIG. 10, dynamic estimator 22a has second predictor 22a1, observation updater 22a2, and calculator 22a3.

Second predictor 22a1 predicts the status of vehicle 20 based on steering angle δ from steering angle sensor 23b and vehicle velocity vx in the travel direction from vehicle velocity sensor 23c. For example, provided that a predicted value is denoted as $$\bar{x},$$ [Math. 1]

and the status of vehicle 20 is denoted as x, second predictor 22a1 performs prediction according to the following Equation 4.

[Math. 2]

$$\bar{x} = f(x) \quad \text{(Equation 4)}$$

In this embodiment, there is no control input, so that the term of the control input is omitted in Equation 4. In this embodiment, as shown by Equation 4, since there is no control input term, next information can be predicted by a simple calculation.

Here, a prediction model for predicting the predicted value $$\bar{x}$$ [Math. 3]

is expressed by the following Equation 5, and status x is expressed by the following Equation 6.

$$\dot{v}x$$ [Math. 4]

denotes an acceleration of vehicle 20, δ denotes the steering angle detected by steering angle sensor 23b, and δb denotes a steering angle bias. For example, the predicted steering angle center value predicted by first predictor 13 of prediction device 10 is used as an initial value of steering angle bias δb.

[Math. 5]

$$\bar{x} = \begin{bmatrix} vx + \dot{v}x \\ \dot{v}x \\ \delta \\ \delta b \end{bmatrix} \quad \text{(Equation 5)}$$

[Math. 6]

$$x = \begin{bmatrix} vx \\ \dot{v}x \\ \delta \\ \delta b \end{bmatrix} \quad \text{(Equation 6)}$$

Provided that a yaw rate is denoted as γ, observed value z is calculated according to the following Equation 7.

[Math. 7]

$$z = \begin{bmatrix} vx \\ \delta \\ \gamma \end{bmatrix} \quad \text{(Equation 7)}$$

Second predictor 22a1 further calculates a variance value (estimation variance value)

$$\overline{P} \quad \text{[Math. 8]}$$

shown in Equation 8. Specifically, provided that a Jacobian of the prediction model is denoted as F, a variance value is denoted as P, and a process noise is denoted as Q, variance value $$\overline{P} \quad \text{[Math. 9]}$$

is calculated according to the following Equation 8.

[Math. 10]

$$\overline{P} = FPF^T + Q \quad \text{(Equation 8)}$$

Here, Jacobian F of the prediction model is defined by the following Equation 9, for example.

[Math. 11]

$$F = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad \text{(Equation 9)}$$

Variance value P is updated by observation updater 22a2 as required, for example. Process noise Q is obtained in advance.

Second predictor 22a1 outputs predicted status $$\overline{x} \quad \text{[Math. 12]}$$

and variance value $$\overline{P} \quad \text{[Math. 13]}$$

to observation updater 22a2.

Observation updater 22a2 calculates Kalman gain K using obtained status $$\overline{x} \quad \text{[Math. 14]}$$

and variance $$\overline{P}. \quad \text{[Math. 15]}$$

For example, observation updater 22a2 calculates Kalman gain K according to the following Equation 10.

[Math. 16]

$$K = \overline{P}H^T(H\overline{P}H^T + R)^{-1} \quad \text{((Equation 10)}$$

Here, R denotes a variance value of the observation error. H denotes a Jacobian of an observation model $$h(\overline{x}) \quad \text{[Math. 17]}$$

described later), and is defined by the following Equation 11.

[Math. 18]

$$H = \begin{bmatrix} 1 & 0 & 0 & 0 \\ 0 & 0 & 1 & 0 \\ \dfrac{\tan(\delta - \delta b)}{L} & 0 & \dfrac{vx(\tan^2(\delta - \delta b) + 1)}{L} & \dfrac{vx(-\tan^2(\delta - \delta b) - 1)}{L} \end{bmatrix} \quad \text{(Equation 11)}$$

Here, L is length L between the axle for the front wheels and the axle for the rear wheels (see FIG. 7A).

Observation updater 22a2 then updates status x and variance value P using observed value z. Estimated value x is calculated according to the following Equation 12, and variance value P is calculated according to the following Equation 13.

[Math. 19]

$$x = \overline{x} + K(z - h(\overline{x})) \quad \text{(Equation 12)}$$

[Math. 20]

$$P = (1 - KH)\overline{P} \quad \text{(Equation 13)}$$

Here, h(x) denotes an observation model, and is calculated according to the following Equation 14.

[Math. 21]

$$h(x) = \begin{bmatrix} vx \\ \delta \\ \dfrac{vx \times \tan(\delta - \delta b)}{L} \end{bmatrix} \quad \text{(Equation 14)}$$

The third line in Equation 14 is based on the relationship between steering angle δ and yaw rate γ, and links observation model h(x) and yaw rate γ to each other.

The calculation $$(z - h(\overline{x})) \quad \text{[Math. 22]}$$

in Equation 12 corresponds to estimation of the difference between the predicted value and actual yaw rate γ.

Calculator 22a3 estimates a steering angle center value by calculating steering angle δ and steering angle bias δb, and outputs the estimated steering angle center value to steering controller 22b. The calculation is addition, for example, and may be a weighted addition. The calculation may also be subtraction, multiplication, or division, for example.

Second predictor 22a1 performs prediction at a next time based on estimated value x and variance P estimated by observation updater 22a2. Such processing is repeatedly performed.

Variation 1 of Embodiment

Figure 11:
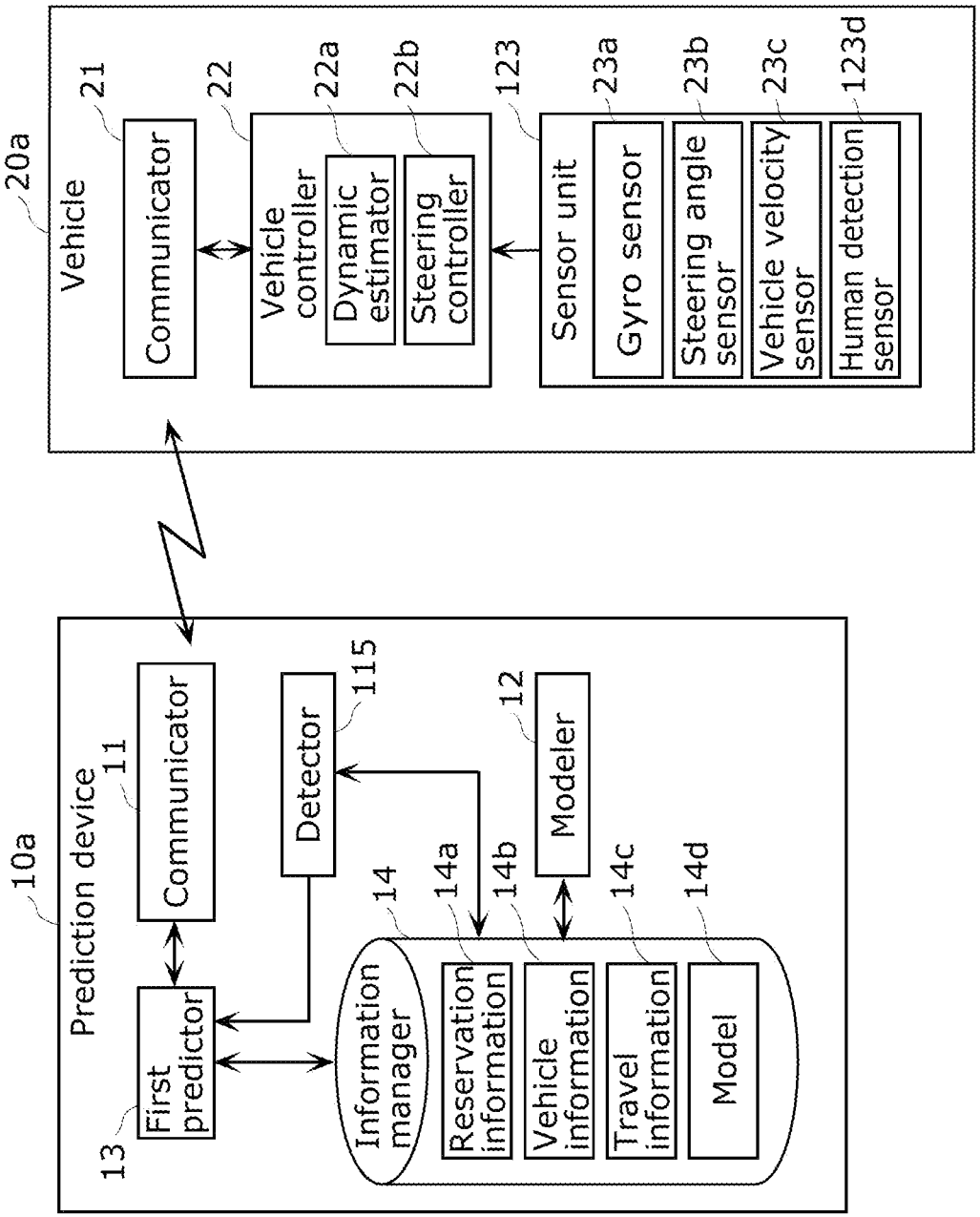
FIG. 11 is a block diagram illustrating a functional configuration of an information processing system according to variation 1 of the embodiment.

In the following, information processing system 1a according to this variation will be described with reference to FIG. 11 and FIG. 12. FIG. 11 is a block diagram illustrating a functional configuration of information processing system 1a according to this variation. Information processing system 1a according to this variation mainly differs from information processing system 1 according to the embodiment in that prediction device 10a has detector 115, and that sensor unit 123 of vehicle 20a has human detection sensor 123d. In the following, information processing system 1a will be described, mainly focusing on differences from information processing system 1 according to the embodiment. In this variation, components that are the same as or similar to those of information processing system 1 according to the embodiment are denoted by the same reference numerals as those of information processing system 1, and descriptions thereof will be omitted or simplified.

As illustrated in FIG. 11, information processing system 1a has prediction device 10a and vehicle 20a. Prediction device 10a has detector 115, in addition to the components of prediction device 10 according to the embodiment. Vehicle 20a has sensor unit 123 having human detection sensor 123d, instead of sensor unit 23 according to the embodiment. In the embodiment, the predicted steering angle center value is predicted using current reservation information 14a. However, when a travel based on reservation information 14a actually occurs, there is a possibility that a passenger does not sit at the passenger position specified in reservation information 14a. In view of this, in this variation, when a travel based on reservation information 14a actually occurs, information processing system 1a predicts the predicted steering angle center value according to the actual passenger position of the passenger.

Human detection sensor 123d detects a passenger who has got on vehicle 20a. Human detection sensor 123d is not particularly limited and can be any sensor that can detect the position of a passenger who has got on vehicle 20a. For example, human detection sensor 123d is implemented by a weight sensor, an imaging sensor or the like. In this variation, human detection sensor 123d is a pressure sensor provided at each seat. Human detection sensor 123d outputs a detected pressure value to prediction device 10a via communicator 21. The pressure value is an example of output data. Human detection sensor 123d is an example of a transported-object detection sensor that detects a transported object put in vehicle 20a.

Detector 115 generates a position of a passenger using output data obtained from vehicle 20a. Specifically, detector 115 determines whether each seat in vehicle 20a is occupied by a passenger based on the pressure value obtained from vehicle 20a. Detector 115 also determines the weight of the passenger using the output data obtained from vehicle 20a. Specifically, detector 115 calculates the weight of the passenger sitting in each seat in vehicle 20a based on the pressure value obtained from vehicle 20a. When human detection sensor 123d is a camera, detector 115 can determine whether a passenger is sitting in a seat by image analysis.

When there is a difference between current reservation information 14a and the determination result of detector 115, that is, when there is a difference between the passenger position according to reservation information 14a and the actual passenger position, first predictor 13 predicts the predicted steering angle center value again. It can be also said that first predictor 13 changes the predicted steering angle center value.

If first predictor 13 obtains the pressure value from human detection sensor 123d, first predictor 13 need not perform the processing of estimating the predicted steering angle center value using current reservation information 14a. First predictor 13 may estimate the predicted steering angle center value using the determination result of detector 115 as first passenger information. In other words, the first passenger information may be generated using the output data of human detection sensor 123d provided to vehicle 20a.

As described above, information processing system 1a according to this variation has vehicle 20a having human detection sensor 123d, and detector 115 that detects a passenger based on the detection result of human detection sensor 123d. First predictor 13 predicts the predicted steering angle center value using the determination result of detector 115.

In this way, information processing system 1a can predict the predicted steering angle center value according to the actual passenger position in vehicle 20. Information processing system 1a can predict the predicted steering angle center value even when current reservation information 14a has not been obtained or when current reservation information 14a includes no information on seats, for example.

Next, an operation of information processing system 1a described above will be described with reference to FIG. 12. FIG. 12 is a flowchart illustrating an operation of information processing system 1a according to this variation. The processing illustrated in FIG. 12 is performed between step S20 and step S30 illustrated in FIG. 5. However, the processing illustrated in FIG. 12 may be performed instead of step S23, for example. In FIG. 12, it is supposed that prediction device 10a obtains the pressure value from human detection sensor 123d, and the pressure value is stored in information manager 14.

Figure 12:
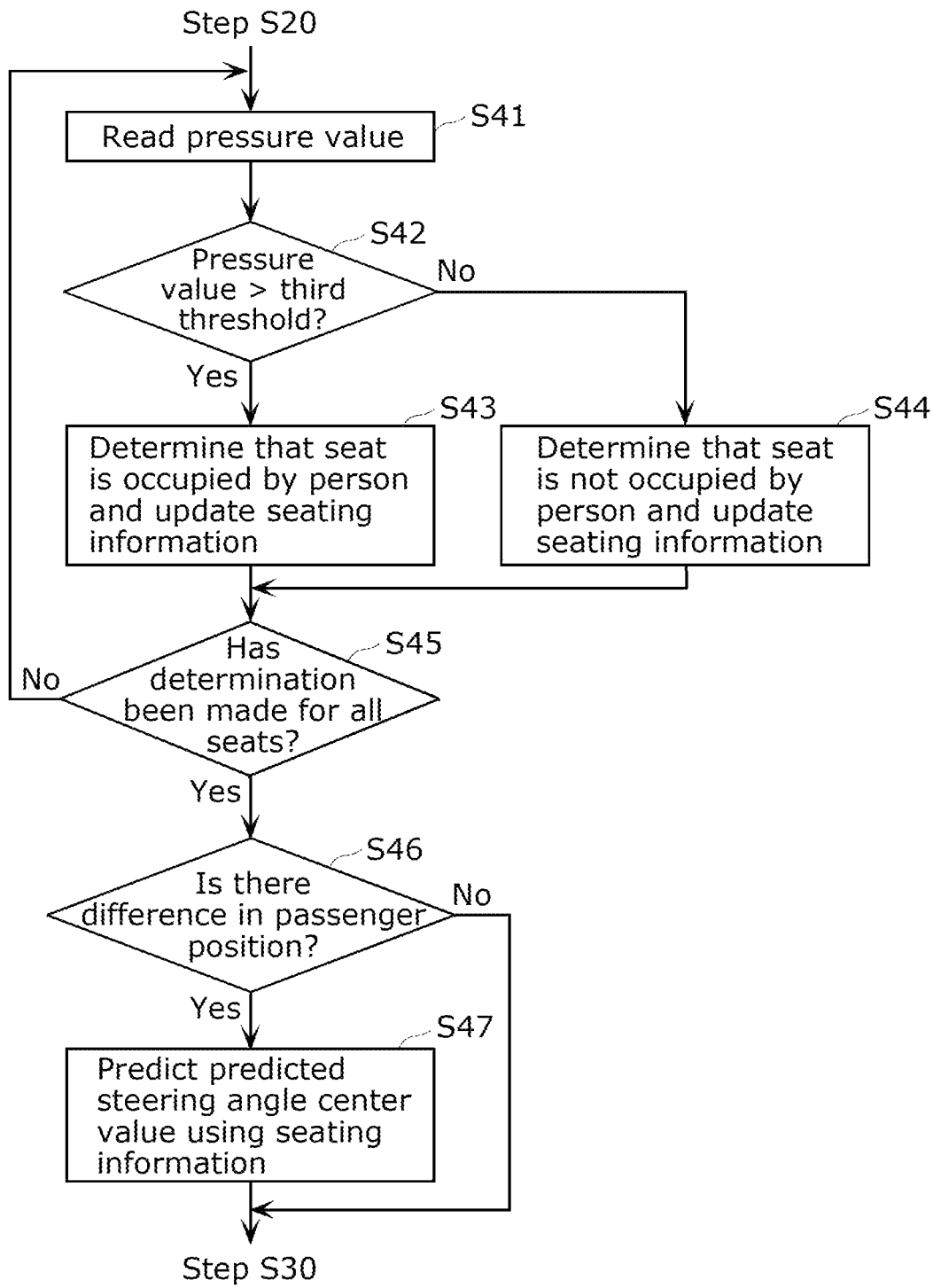
FIG. 12 is a flowchart illustrating an operation of the information processing system according to variation 1 of the embodiment.

As illustrated in FIG. 12, detector 115 reads a pressure value from information manager 14 (S41), and determines whether the pressure value is greater than a third threshold (S42). The third threshold can be any value that allows determination of whether a passenger sits in a seat. When the pressure value is greater than the third threshold (if Yes in S42), detector 115 determines that the seat is occupied by a person (passenger), and updates seating information on vehicle 20 (S43). When the pressure value is equal to or smaller than the third threshold (if No in S42), detector 115 determines that the seat is not occupied by a person (passenger), and updates the seating information (S44).

Detector 115 then determines whether the determination in step S42 has been performed for all seats (S45). When the determination in step S42 has been performed for all seats (if Yes in S45), detector 115 proceeds to step S46. When the determination in step S42 has not been performed for all seats (if No in S45), detector 115 returns to step S41, and performs the processing for a next seat.

When there is current reservation information 14a, detector 115 determines whether there is a difference between the passenger position according to current reservation information 14a and the actual passenger position based on the seating information (S46). That there is a difference between the passenger positions means that the passenger positions are different or that the numbers of passengers are different, for example. When human detection sensor 123d is a camera, and detector 115 identifies a person who gets on the vehicle by image analysis, detector 115 may determine whether the identified person is a person included in current reservation information 14a. Detector 115 outputs the determination result to first predictor 13.

Once first predictor 13 obtains the determination result indicating that there is a difference between the passenger position according to current reservation information 14a and the actual passenger position based on the seating information, first predictor 13 predicts the predicted steering angle center value again using the seating information (S47). That is, first predictor 13 predicts the predicted steering angle center value using the actual passenger position of the passenger. The processing of predicting the predicted steering angle center value is the same as the prediction processing (S20), and descriptions thereof will be omitted. First predictor 13 outputs the predicted steering angle center value predicted again to vehicle 20a. When there is no reservation information 14a, the processing of step S47 is performed without performing the processing of step S46.

In this way, vehicle 20a can obtain the predicted steering angle center value according to the actual seating status (such as the passenger position), and can control the steering angle according to the actual seating status.

Although an example has been described in this variation where the predicted steering angle center value is predicted using current reservation information 14a, and then the predicted steering angle center value is changed based on the output data of human detection sensor 123d, the present disclosure is not limited to this. If prediction device 10a obtains the output data of human detection sensor 123d, prediction device 10a need not predict the predicted steering angle center value using current reservation information 14a. In other words, prediction device 10a may predict the predicted steering angle center value using the output data of human detection sensor 123d.

Variation 2 of Embodiment

Figure 13:
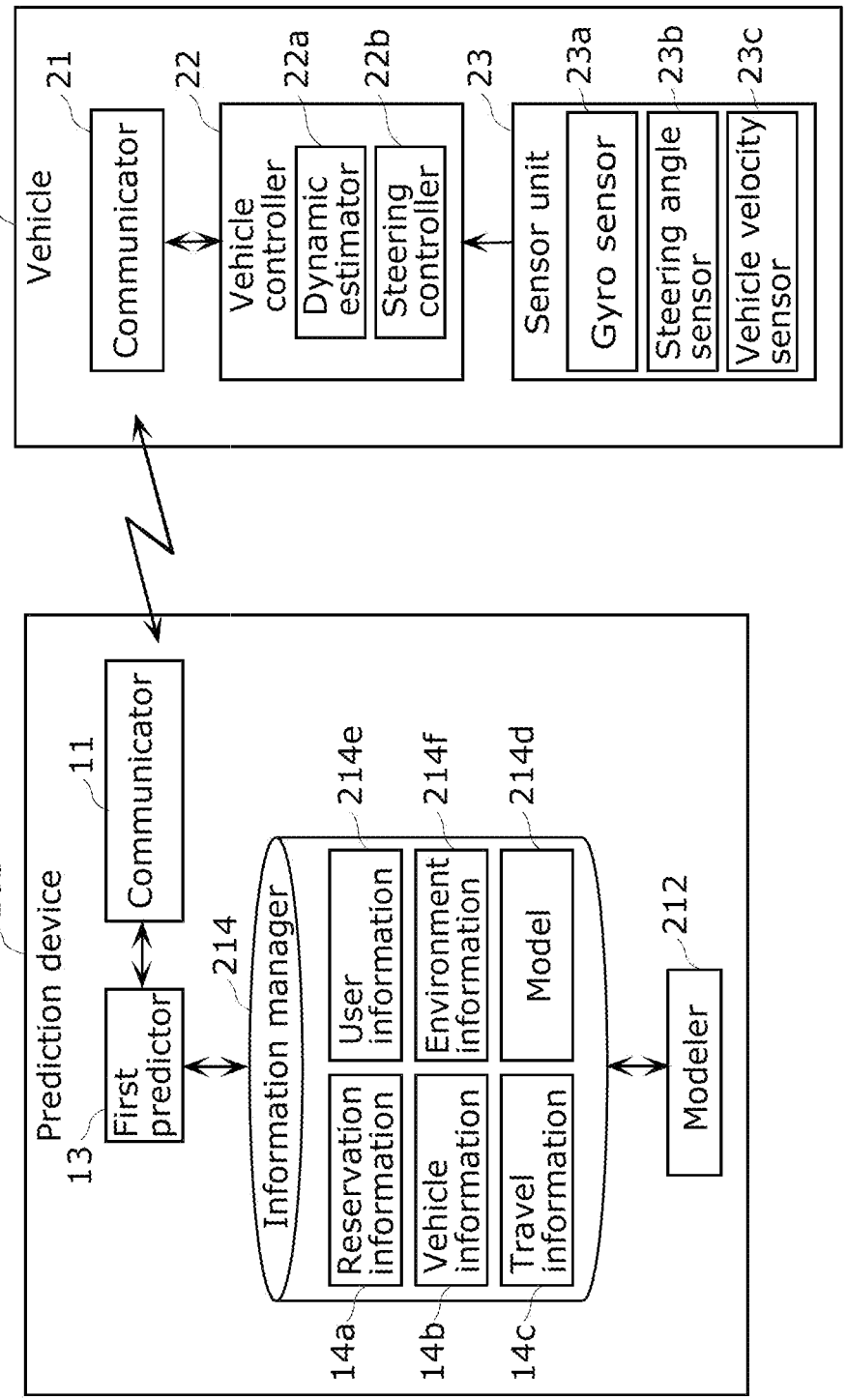
FIG. 13 is a block diagram illustrating a functional configuration of an information processing system according to variation 2 of the embodiment.

In the following, information processing system 1b according to this variation will be described with reference to FIG. 13 to FIG. 16. FIG. 13 is a block diagram illustrating a functional configuration of information processing system 1b according to this variation. Information processing system 1b according to this variation mainly differs from information processing system 1 according to the embodiment in that modeler 212 of prediction device 10b generates a machine learning model. In the following, information processing system 1b according to this variation will be described, mainly focusing on differences from information processing system 1 according to the embodiment. In this variation, components that are the same as or similar to those of information processing system 1 according to the embodiment are denoted by the same reference numerals as those of information processing system 1, and descriptions thereof will be omitted or simplified.

As illustrated in FIG. 13, information processing system 1b has prediction device 10b and vehicle 20. Prediction device 10b has communicator 11, modeler 212, first predictor 13, and information manager 214.

Modeler 212 generates model 214d, which is a machine learning model. Modeler 212 generates model 214d that receives the position and weight of a passenger and the weight of vehicle 20 as inputs and outputs a predicted steering angle center value at that time. Model 214d is a neural network learning model, for example, but is not limited thereto.

When first predictor 13 obtains current reservation information 14a, first predictor 13 reads model 214d, and outputs, to vehicle 20, a predicted steering angle center value obtained by inputting the position and weight of the passenger and the weight of vehicle 20 included in reservation information 14a to read model 214d.

Information manager 214 stores various kinds of information for generating model 214d, in addition to the information stored in information manager 14 according to the embodiment. For example, information manager 214 further stores user information 214e and environment information 214f.

User information 214e includes attribute information on a passenger. For example, user information 214e includes "name", "ID", "sex", "age", and "birthplace" illustrated in FIG. 14, for example. FIG. 14 is a diagram illustrating an example of user information 214e according to this variation. Note that "sex", "age", and "birthplace" are examples of attribute information on a passenger. For example, the attribute information on a passenger includes information that can relate to a physical characteristic of the passenger.

"Name" indicates the name of the passenger, and may be a nickname.

"ID" is identification information for identifying the passenger, and is an identification number assigned to each passenger.

"Sex" indicates the sex of the passenger.

"Age" indicates the age of the passenger. "Age" may be a specific numerical value or may be a generation.

"Birthplace" indicates the birthplace of the passenger.

As user information 214e, the items described above are set for each of a plurality of vehicles 20 (each of vehicle 1 to vehicle 4 in FIG. 14), for example. In the example of "vehicle 1", the items of information described above are stored for each of passengers A, F, and N. Passenger A, F, or N may be a person who used or reserved "vehicle 1" in the past, or may be a person who will reserve "vehicle 1" in the future. Such information is registered in advance.

User information 214e may further include other information for estimating the weight of the passenger. For example, user information 214e may include height, body shape, or weight itself.

Environment information 214f includes information concerning the environment of vehicle 20. Environment information 214f includes "temperature", "humidity", "road condition", "wind direction", and "wind speed" as illustrated in FIG. 15, for example. FIG. 15 is a diagram illustrating an example of environment information 214f according to this variation.

"Temperature" and "humidity" indicate the temperature and the humidity of the surroundings of vehicle 20 traveling.

"Road condition" indicates the condition of the road on which vehicle 20 travels.

"Wind direction" and "wind speed" indicate the wind direction and the wind speed of the surroundings of vehicle 20 traveling.

When a planned travel route is obtained from "place of departure" and "place of destination" in current reservation information 14a, prediction device 10b may obtain environment information about the periphery of the travel route from a server device that manages the environment information. Environment information 214f is an example of environment information.

As described above, information processing system 1b according to this variation has modeler 212 that generates model 214d by machine learning.

Therefore, information processing system 1b can predict the predicted steering angle center value with higher precision by using the machine learning model (model 214d) instead of the least square method. By using user information 214e and environment information 214f when generating the machine learning model, information processing system 1b can generate model 214d that can predict the predicted steering angle center value with even higher precision. Furthermore, information processing system 1b can estimate the position of the center of gravity of vehicle 20 using the machine learning model and calculate the relationship between the position of the center of gravity and the steering angle center value using the least square method, in order to reduce the dependence of the machine learning model on vehicle 20.

Figure 16:
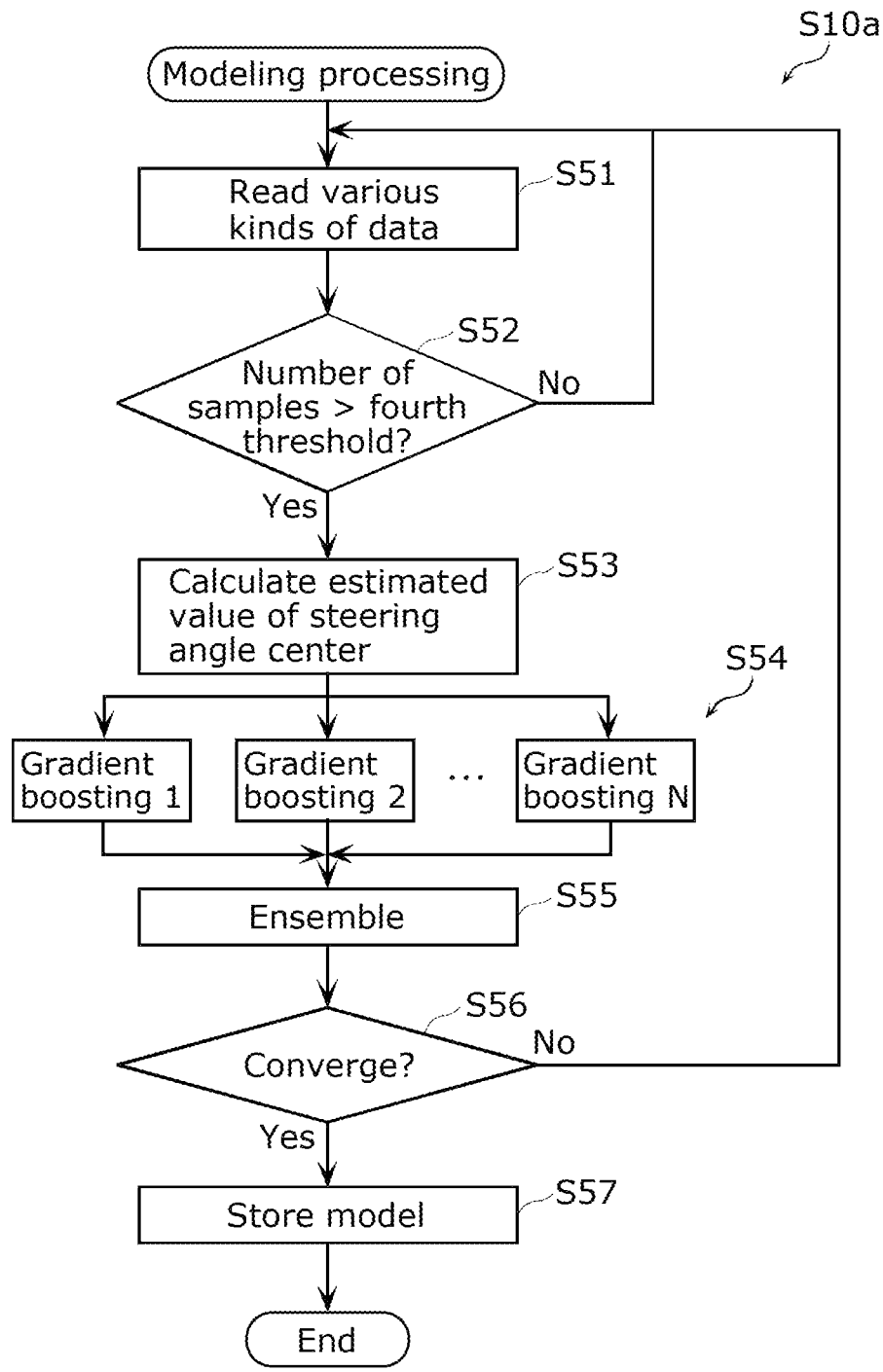
FIG. 16 is a flowchart illustrating an operation of the information processing system according to variation 2 of the embodiment.

Next, an operation of information processing system 1b described above will be described with reference to FIG. 16. FIG. 16 is a flowchart illustrating an operation of information processing system 1b according to this variation. The processing illustrated in FIG. 16 is modeling processing (S10a), and step S10a is performed instead of step S10 illustrated in FIG. 4, for example.

As illustrated in FIG. 16, modeler 212 reads various kinds of data for generating model 214d from information manager 214 (S51). For example, modeler 212 reads at least one of past reservation information 14a, vehicle information 14b, travel information 14c, user information 214e, and environment information 214f as training data for generating model 214d. The training data may include user information 214e on a passenger, for example. That is, the training data may include attribute information on a passenger. The training data may also include environment information 214f on the outside of vehicle 20, for example. Modeler 212 may read, as the training data, all of past reservation information 14a, vehicle information 14b, travel information 14c, user information 214e, and environment information 214f.

Modeler 212 then determines whether the number of samples of the various kinds of data read is greater than a fourth threshold (S52). In step S52, modeler 212 determines whether there is a sufficient number of samples of data to generate model 214d. The fourth threshold is not particularly limited and can be any value that allows modeler 212 to generate model 214d. By performing the determination of step S52, modeler 212 can generate model 214d using various kinds of data on various cases.

When the number of samples is greater than the fourth threshold (if Yes in S52), modeler 212 calculates an estimated value of the steering angle center (S53). The processing of step S53 is the same as the processing of step S13, and descriptions thereof will be omitted. When the number of samples is equal to or smaller than the fourth threshold (if No in S52), modeler 212 returns to step S51, and continues the processing.

For modeler 212 to construct model 214d, various methods can be used. In this embodiment, model 214d is constructed in a gradient boosting method (S54 and S55), which is an ensemble learning method that constructs model 214d using a combination of a plurality of weak learners in which a learning result of one weak learner is used as a reference for training another weak learner and a gradient of a loss function is used. The loss function is a function that outputs the difference between a predicted value and a correct value (in other words, a reference value).

The construction of model 214d is not limited to the method described above, and an ensemble learning, such as Banking or other learnings may be used.

In this way, model 214d is generated using machine learning using past reservation information 14a and vehicle information 14b as training data and a steering angle center value as reference data, for example.

Modeler 212 then determines whether generated model 214d converges (S56). When model 214d converges (if Yes in S56), modeler 212 stores generated model 214d in information manager 214 (S57). When model 214d does not converge (if No in S56), modeler 212 returns to step S51, and continues the processing.

Variation 3 of Embodiment

In the following, information processing system 1c according to this variation will be described with reference to FIG. 17 to FIG. 19. FIG. 17 is a block diagram illustrating a functional configuration of information processing system 1c according to this variation. Information processing system 1c according to this variation mainly differs from information processing system 1 according to the embodiment in that vehicle 20c includes determiner 325. In the following, information processing system 1c according to this variation will be described, mainly focusing on differences from information processing system 1 according to the embodiment. In this variation, components that are the same as or similar to those of information processing system 1 according to the embodiment are denoted by the same reference numerals as those of information processing system 1, and descriptions thereof will be omitted or simplified.

As illustrated in FIG. 17, information processing system 1c includes prediction device 10 and vehicle 20c. Vehicle 20c has determiner 325 that determines whether vehicle 20c is traveling straight, in addition to the components of vehicle 20 according to the embodiment. This is because the dynamic estimation processing can be performed with higher estimation precision when vehicle 20c is traveling straight than when vehicle 20c is turning.

Vehicle 20c has determiner 325 that determines whether vehicle 20 is traveling straight based on output data of sensor unit 23, in addition to the components of vehicle 20 according to the embodiment. Vehicle 20c also has dynamic estimator 322a instead of dynamic estimator 22a.

Determiner 325 determines whether vehicle 20c is traveling straight using a yaw rate, which is output data of gyro sensor 23a, for example.

Dynamic estimator 322a performs a dynamic estimation processing based on the determination result of determiner 325. Specifically, dynamic estimator 322a performs the dynamic estimation processing when the vehicle is traveling straight. For example, dynamic estimator 322a performs the dynamic estimation processing only when the vehicle is traveling straight. In other words, dynamic estimator 322a does not perform the dynamic estimation processing when the vehicle is turning.

As described above, information processing system 1c according to this variation includes determiner 325 that determines whether the vehicle is traveling straight. Dynamic estimator 322a performs the dynamic estimation processing when determiner 325 has determined that the vehicle is traveling straight.

In this way, since the dynamic estimation of the steering angle center is performed only when the vehicle is traveling straight, information processing system 1c can improve the estimation precision.

Next, an operation of information processing system 1c described above will be described with reference to FIG. 18 and FIG. 19. FIG. 18 is a flowchart illustrating determination processing according to this variation. In FIG. 18, a gyro sensor value, which is output data of gyro sensor 23a, is stored in a storage device (not shown) of vehicle 20c as required. The gyro sensor value is a yaw rate, for example.

Figure 18:
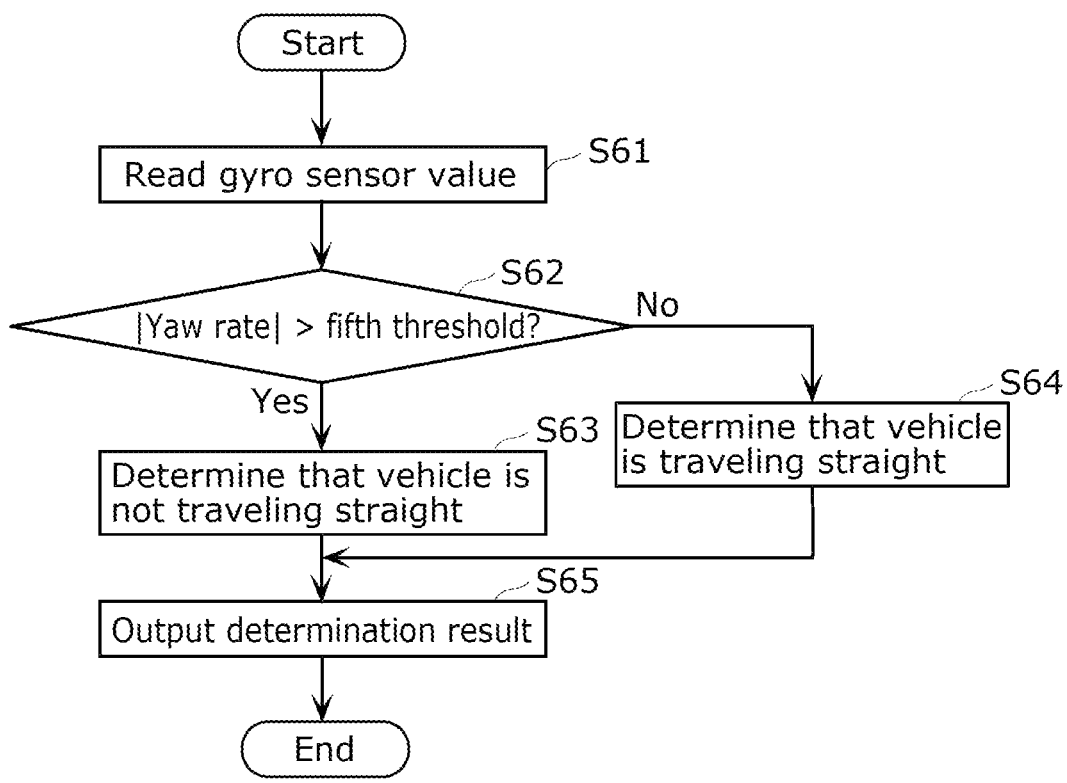
FIG. 18 is a flowchart illustrating determination processing according to variation 3 of the embodiment.

As illustrated in FIG. 18, determiner 325 reads a gyro sensor value (S61). For example, determiner 325 reads the latest yaw rate from the storage device. Determiner 325 then determines whether the absolute value of the yaw rate is greater than a fifth threshold (S62). The fifth threshold is not particularly limited, and can be any value that allows determination of whether the vehicle is traveling straight.

When the absolute value of the yaw rate is greater than the fifth threshold (if Yes in S62), determiner 325 determines that the vehicle is not traveling straight, that is, the vehicle is turning (S63). When the absolute value of the yaw rate is equal to or smaller than the fifth threshold (if No in S62), determiner 325 determines that the vehicle is traveling straight (S64). Determiner 325 then outputs the determination result to dynamic estimator 322a (S65).

Determiner 325 may perform the operation illustrated in FIG. 18 at predetermined time intervals or as required.

Next, an operation of dynamic estimator 322a will be described with reference to FIG. 19. FIG. 19 is a flowchart illustrating details of the dynamic estimation processing (S30a) according to this variation.

Figure 19:
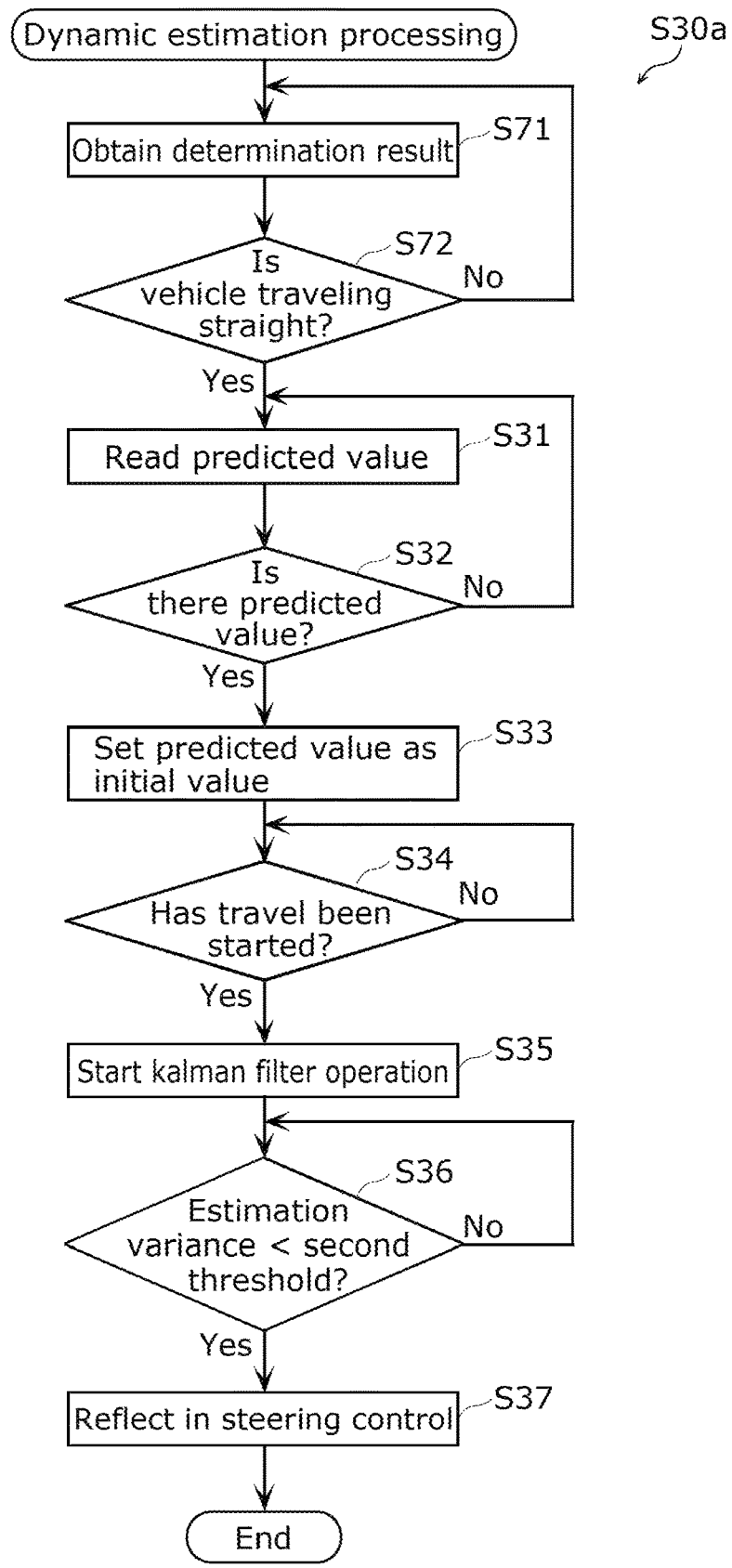
FIG. 19 is a flowchart illustrating details of dynamic estimation processing according to variation 3 of the embodiment.

As illustrated in FIG. 19, the dynamic estimation processing (S30a) according to this variation includes steps S71 and S72, in addition to the steps of the dynamic estimation processing (S30) according to the embodiment.

When dynamic estimator 322a obtains the determination result from determiner 325 (S71), dynamic estimator 322a determines, based on the determination result, whether the vehicle is traveling straight (S72). When the determination result includes information indicating that the vehicle is traveling straight, that is, when the vehicle is traveling straight (if Yes in S72), dynamic estimator 322a performs step S31 and the following processing. When the determination result includes information indicating that the vehicle is not traveling straight, that is, when the vehicle is not traveling straight (if No in S72), dynamic estimator 322a returns to step S71, and continues the processing. That is, if No in Step S72, subsequent estimation processing in the dynamic estimation processing is not performed.

Variation 4 of Embodiment

Figure 20:
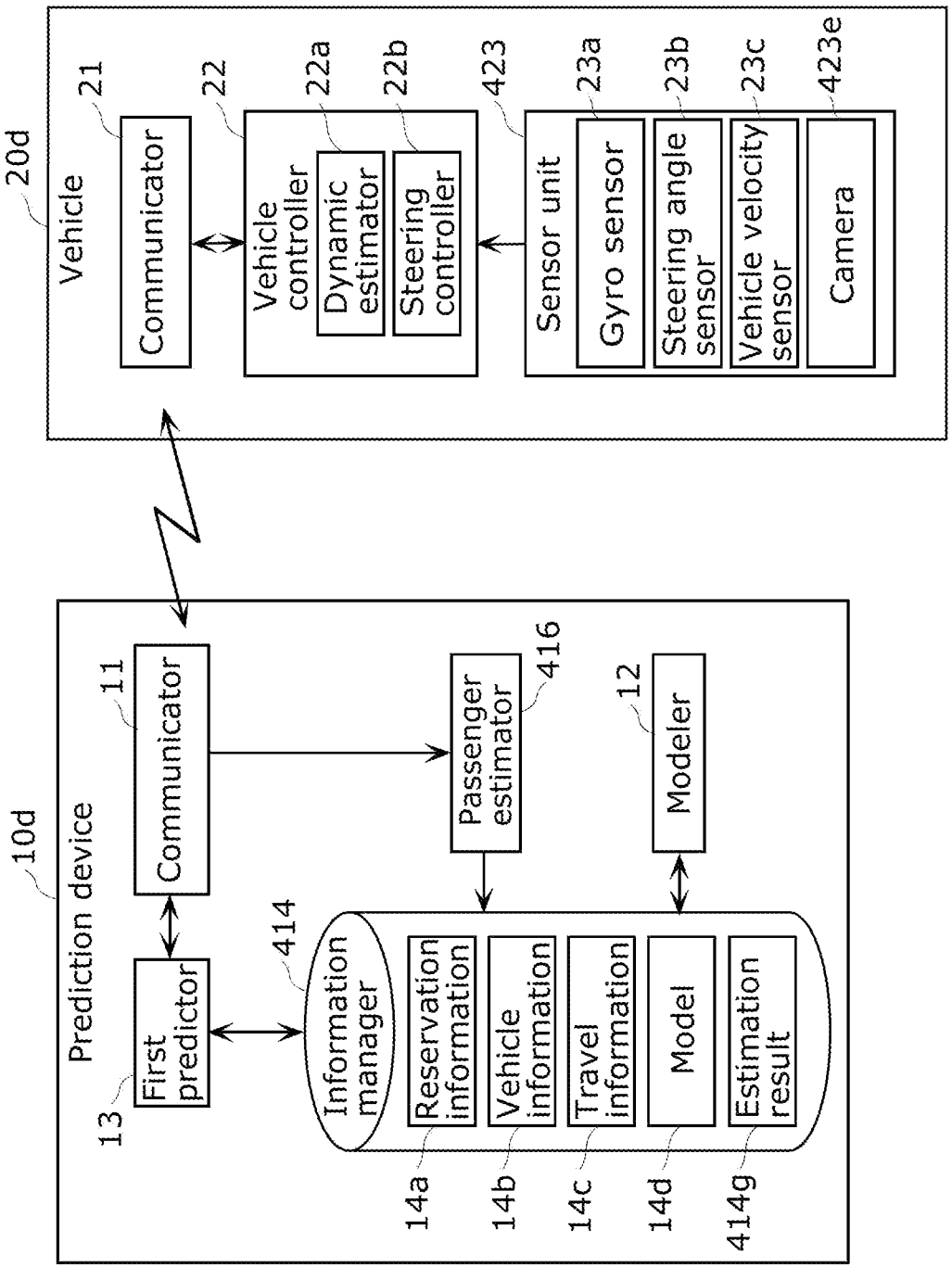
FIG. 20 is a block diagram illustrating a functional configuration of an information processing system according to variation 4 of the embodiment.

In the following, information processing system 1d according to this variation will be described with reference to FIG. 20 and FIG. 21. FIG. 20 is a block diagram illustrating a functional configuration of information processing system 1d according to this variation. Information processing system 1d according to this variation mainly differs from information processing system 1 according to the embodiment in that sensor unit 423 of vehicle 20d has camera 423e and that prediction device 10d has passenger estimator 416 that performs estimation about a passenger based on an image taken by camera 423e. In the following, information processing system 1d according to this variation will be described, mainly focusing on differences from information processing system 1 according to the embodiment. In this variation, components that are the same as or similar to those of information processing system 1 according to the embodiment are denoted by the same reference numerals as those of information processing system 1, and descriptions thereof will be omitted or simplified.

As illustrated in FIG. 20, information processing system 1d includes prediction device 10d and vehicle 20d. In information processing system 1d according to this variation, passenger estimator 416 of prediction device 10d estimates the weight and the position of the center of gravity of a passenger from an image, and modeler 12 further estimates the position of the center of gravity of vehicle 20d using estimation result 414g.

Vehicle 20d has sensor unit 423 including camera 423e. Camera 423e takes an image of the inside of vehicle 20d. Camera 423e takes an image from which the weight and the position of the center of gravity of a passenger who has got on vehicle 20d can be obtained. A plurality of cameras 423e may be provided. Vehicle 20d outputs the image taken by camera 423e to prediction device 10d.

Prediction device 10d has passenger estimator 416 that estimates the weight and the position of the center of gravity of the passenger based on the image taken by camera 423e, and information manager 414 that stores estimation result 414g by passenger estimator 416.

Passenger estimator 416 estimates the weight of the passenger and the position of the center of gravity of the passenger by performing image analysis of the image taken by camera 423e. For example, passenger estimator 416 estimates the weight and the position of the center of gravity of each passenger. Any existing technique can be used for the estimation of the weight and the position of the center of gravity. The estimation of the position of the center of gravity may be performed by estimating the posture of the passenger from the image and using the estimated posture, for example.

Information manager 414 stores a plurality of estimation results 414g. Estimation result 414g may be stored in association with travel information 14c at the time when estimation result 414g is obtained.

In the modeling processing, modeler 12 estimates the position of the center of gravity of vehicle 20d using estimation result 414g from passenger estimator 416.

As described above, information processing system 1d according to this variation includes camera 423e that takes an image of the inside of the vehicle, and passenger estimator 416 that estimates the weight and the position of the center of gravity of a passenger who has got on vehicle 20d by performing image analysis of the image taken by camera 423e.

In this way, information processing system 1d can accurately obtain the weight and the position of the center of gravity of the passenger, so that the estimation precision of the position of the center of gravity of vehicle 20d can be improved. Modeler 12 can estimate the position of the center of gravity of vehicle 20d even when modeler 12 has not obtained past reservation information 14a. In this case, estimation result 414g is an example of a detection result. Passenger information is generated using estimation result 414g. First passenger information is generated using current estimation result 414g for the passenger that is based on output data (image data) of camera 423e provided to vehicle 20d, and second passenger information is generated using past estimation result 414g for the passenger that is based on output data obtained in the past.

Next, an operation of information processing system 1d described above will be described with reference to FIG. 21. FIG. 21 is a flowchart illustrating determination processing according to this variation.

Figure 21:
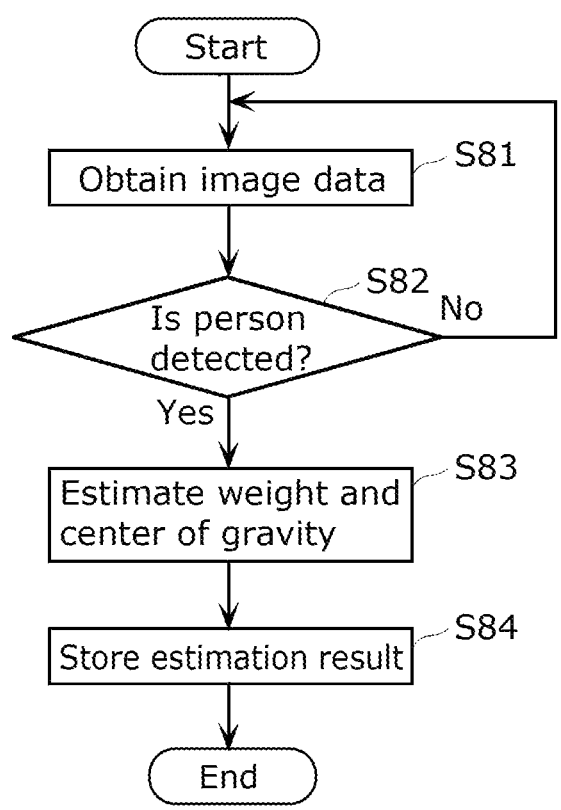
FIG. 21 is a flowchart illustrating an operation of the information processing system according to variation 4 of the embodiment.

As illustrated in FIG. 21, passenger estimator 416 obtains image data taken by camera 423e (S81). Passenger estimator 416 may read image data from information manager 414. Passenger estimator 416 then determines whether a person is detected in the obtained image data (S82). Passenger estimator 416 determines whether a person is seen in the image by image analysis of the image data. In other words, passenger estimator 416 determines whether a passenger has got on vehicle 20d by image analysis of the image data.

When a person is detected (if Yes in S82), passenger estimator 416 estimates the weight and the position of the center of gravity of the person (S83). That is, passenger estimator 416 estimates the weight and the position of the center of gravity of the passenger. Passenger estimator 416 then stores estimation result 414g estimated in information manager 414 (S84). When no person is detected (if No in S82), passenger estimator 416 returns to step S81, and continues the processing.

When a plurality of persons is detected in step S82, passenger estimator 416 performs the processing of step S83 for each of the plurality of persons.

Prediction device 10d may predict a predicted steering angle center value using current reservation information 14a and then perform processing of changing the predicted steering angle center value based on the image data from camera 423e. when prediction device 10d obtains image data from camera 423e, prediction device 10d need not predict a predicted steering angle center value using current reservation information 14a. In other words, prediction device 10d may predict a predicted steering angle center value using image data from camera 423e. Image data from camera 423e includes information on the position of a passenger and the weight of the passenger.

Variation 5 of Embodiment

Figure 22:
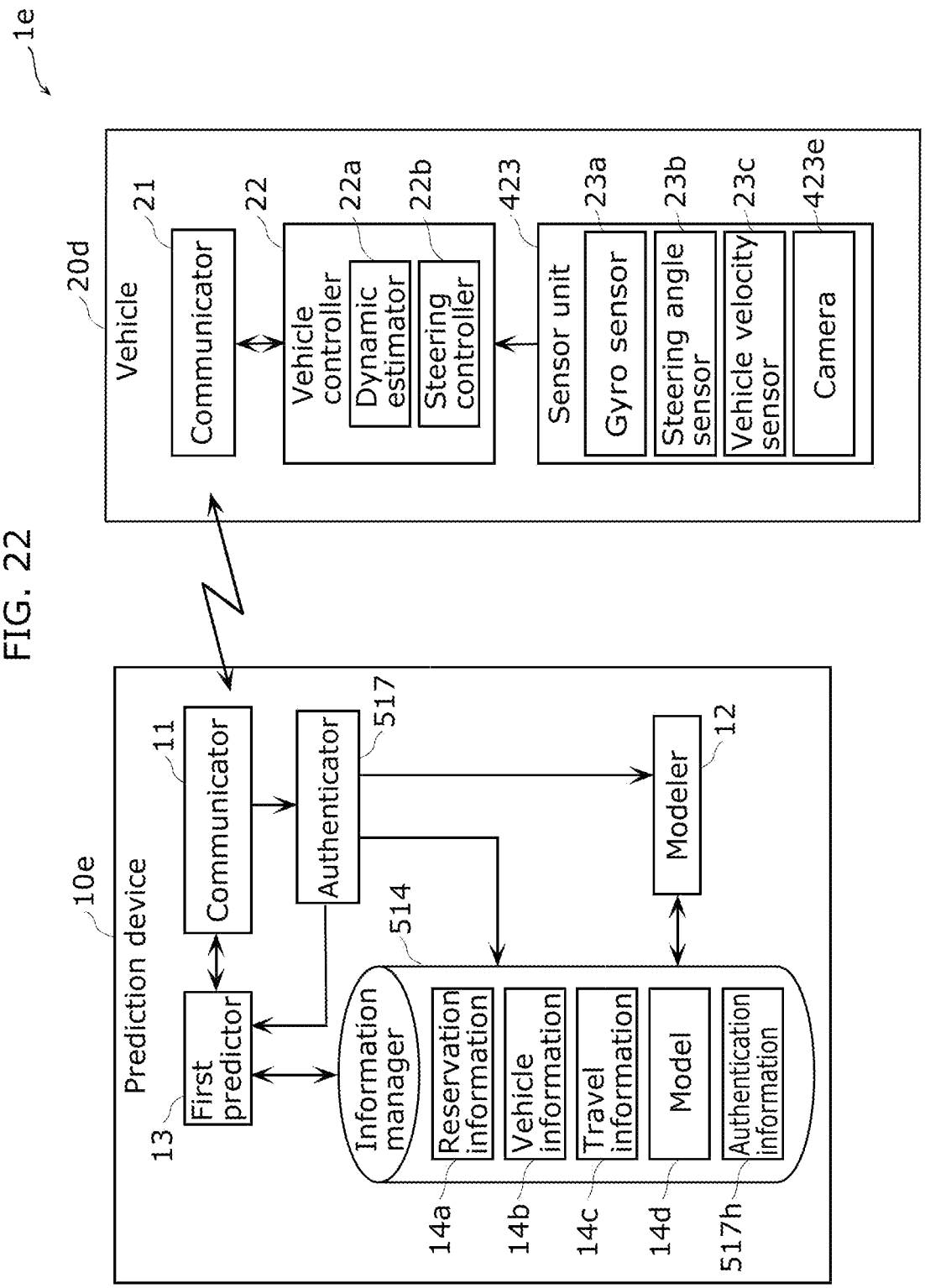
FIG. 22 is a block diagram illustrating a functional configuration of an information processing system according to variation 5 of the embodiment.

In the following, information processing system 1e according to this variation will be described with reference to FIG. 22 to FIG. 23. FIG. 22 is a block diagram illustrating a functional configuration of information processing system 1e according to this variation. Information processing system 1e according to this variation mainly differs from information processing system 1d according to variation 4 of the embodiment in that prediction device 10e has authenticator 517 instead of passenger estimator 416. In the following, information processing system 1e according to this variation will be described, mainly focusing on differences from information processing system 1d according to variation 4 of the embodiment. In this variation, components that are the same as or similar to those of information processing system 1d according to variation 4 of the embodiment are denoted by the same reference numerals as those of information processing system 1d, and descriptions thereof will be omitted or simplified.

As illustrated in FIG. 22, information processing system 1e includes prediction device 10e and vehicle 20d. In information processing system 1e according to this variation, authenticator 517 of prediction device 10e individually identifies a passenger from a result of authentication of an image, and obtains information on the identified passenger from information manager 514.

Authenticator 517 identifies an individual by performing face authentication on an image taken by camera 423e, and outputs the authentication result to modeler 12 and first predictor 13. For example, authenticator 517 identifies an individual by comparing authentication information 517h and image data. Authenticator 517 may store the authentication result in information manager 514. The method of identifying an individual is not limited to the face authentication. The authentication result is an example of a passenger identification result. The identification result is included in a passenger detection result based on image data from camera 423e.

Modeler 12 obtains information concerning the passenger based on the authentication result, and estimates the position of the center of gravity of vehicle 20d using the obtained information. Modeler 12 generates model 14d using the estimated position of the center of gravity. The information concerning the passenger may be user information 214e. Modeler 12 may generate model 14d using second passenger information generated using user information 214e on the passenger identified based on the authentication result, for example. Specifically, modeler 12 generates passenger information using attribute information included in user information 214e on the passenger identified based on the authentication result. Modeler 12 estimates the position or weight of the passenger from "age", "sex" or other information included in the attribute information. For example, when the identified passenger is an elderly person, the passenger is estimated to sit in a priority seat. Modeler 12 estimates the position of the center of gravity of vehicle 20d using the generated passenger information. Model 14d is generated using the estimated position of the center of gravity.

First predictor 13 obtains information concerning the passenger based on the authentication result, and estimates the position of the center of gravity of vehicle 20d using the obtained information. First predictor 13 predicts the estimated steering angle center value using the estimated position of the center of gravity. For example, first predictor 13 predicts the predicted steering angle center value using the weight of the passenger obtained based on the authentication result. First predictor 13 may estimate the position of the center of gravity and predict the predicted steering angle center value using first passenger information generated using user information 214e on the passenger identified based on the authentication result, for example. Specifically, first predictor 13 generates passenger information using attribute information included in user information 214e on the passenger identified based on the authentication result. The processing of generating the passenger information based on the attribute information is the same as the processing described above. First predictor 13 estimates the position of the center of gravity of vehicle 20d using the generated passenger information. The predicted steering angle center value is predicted by inputting the estimated position of the center of gravity to model 14d.

Information manager 514 stores authentication information 517h for authenticator 517 to identify a passenger. Authentication information 517h may be an image of the face of a user registered or may be information indicating characteristics of the face of a user.

As described above, information processing system 1e according to this variation includes camera 423e that takes an image of the inside of the vehicle, and authenticator 517 that identifies a passenger who has got on vehicle 20d by performing authentication processing on the image taken by camera 423e.

Therefore, information processing system 1 can identify a person who has got on vehicle 20d. Modeler 12 can correctly obtain information concerning the person who has got on vehicle 20d by obtaining user information 214e on the identified person from information manager 514. Therefore, modeler 12 can improve the estimation precision of the position of the center of gravity of vehicle 20d, that is, the estimation precision of model 14d generated. Furthermore, first predictor 13 can correctly obtain information concerning the person who has got on vehicle 20d by obtaining user information 214e on the identified person from information manager 514, for example. Therefore, first predictor 13 can improve the prediction precision of the predicted steering angle center value of vehicle 20d.

Next, an operation of information processing system 1e described above will be described with reference to FIG. 23. FIG. 23 is a flowchart illustrating determination processing according to this variation.

Figure 23:
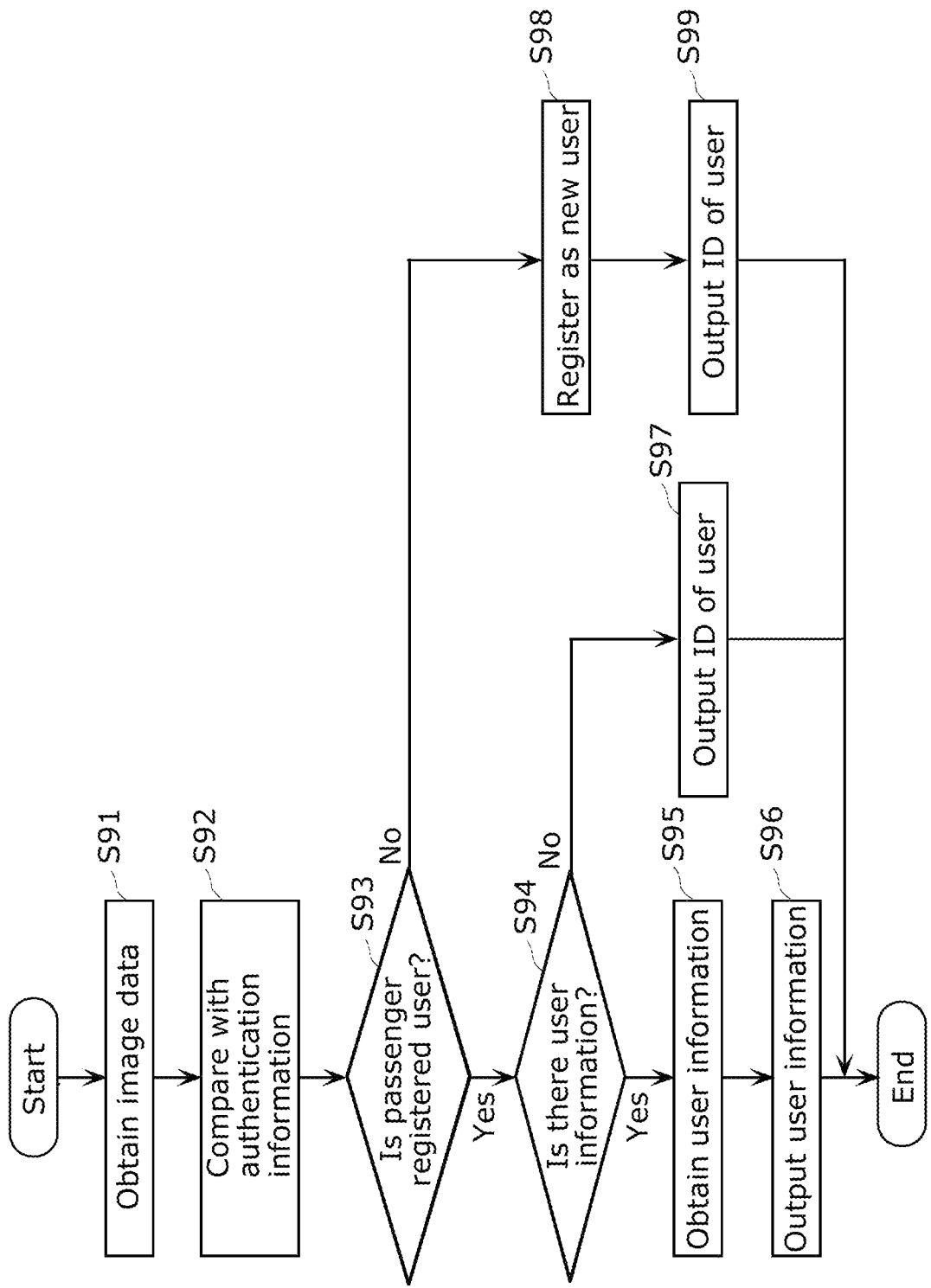
FIG. 23 is a flowchart illustrating an operation of the information processing system according to variation 5 of the embodiment.

As illustrated in FIG. 23, authenticator 517 obtains image data taken by camera 423e (S91). Authenticator 517 may read image data from information manager 514. Authenticator 517 then compares the analysis result of the obtained image data and authentication information 517h stored in information manager 514 (S92), and determines whether the passenger is a registered user (S93).

When the passenger is a registered user (if Yes in S93), authenticator 517 determines whether there is user information 214e concerning the user (S94). When there is user information 214e concerning the user (if Yes in S94), authenticator 517 obtains user information 214e (S95), and outputs obtained user information 214e to at least one of modeler 12 and first predictor 13 (S95). In this variation, authenticator 517 outputs user information 214e to both modeler 12 and first predictor 13.

When there is no user information 214e concerning the user (if No in S94), authenticator 517 outputs the ID of the registered user to at least one of modeler 12 and first predictor 13 (S97). In this way, authenticator 517 can store various kinds of data to be obtained after that in information manager 514 in association with the existing user ID.

When the passenger is not a registered user (if No in S93), authenticator 517 registers the user as a new user (S98). For example, in step S98, authenticator 517 sets a new user ID for the user. Authenticator 517 then outputs the set user ID to at least one of modeler 12 and first predictor 13 (S99). In this way, authenticator 517 can store various kinds of data to be obtained after that in information manager 514 in association with the new registered user ID.

Other Embodiments

Although the present disclosure has been described based on the embodiments and variations (hereinafter, referred to also as "embodiments etc.", the present disclosure is not limited to this embodiment. Those skilled in the art will readily appreciate that embodiments arrived at by making various modifications to the above embodiment or embodiments arrived at by selectively combining elements disclosed in the above embodiment without materially departing from the scope of the present disclosure may be included within one or more aspects of the present disclosure.

Figure 24:
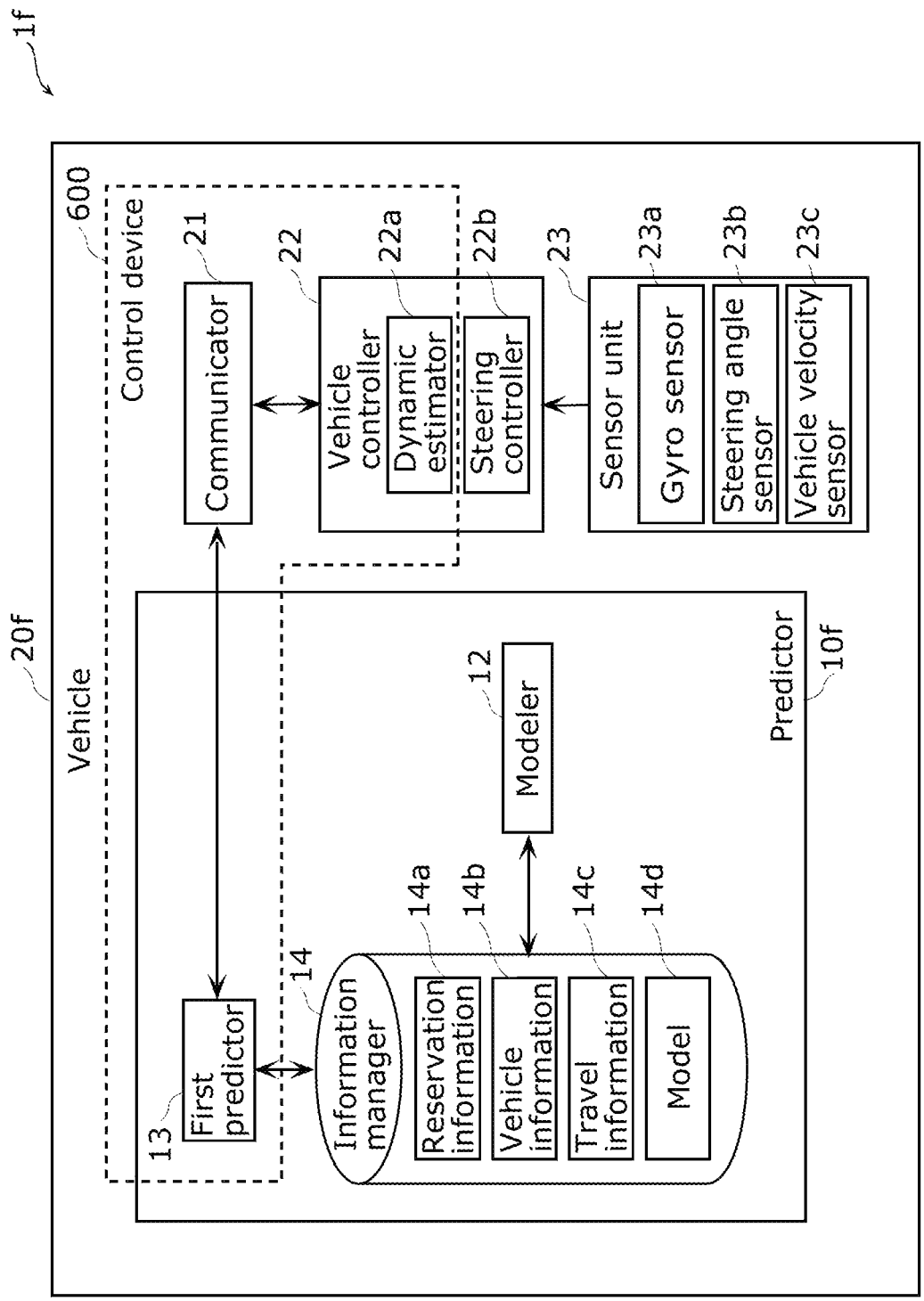
FIG. 24 is a block diagram illustrating a functional configuration of an information processing system according to another embodiment.

For example, although, in the embodiment described above and the like, examples have been described where the prediction device and the vehicle are separate entities, the present disclosure is not limited to this. For example, the prediction device may be mounted on the vehicle. In that case, as illustrated in FIG. 24, the prediction device functions as a predictor of the vehicle. FIG. 24 is a block diagram illustrating a functional configuration of information processing system 1f according to another embodiment.

As illustrated in FIG. 24, information processing system 1f includes vehicle 20f. Vehicle 20f includes predictor 10f, communicator 21, vehicle controller 22, and sensor unit 23. First predictor 13, communicator 21, and dynamic estimator 22a form control device 600. That is, control device 600 is mounted on vehicle 20f.

Although, in the embodiment described above and the like, examples have been described where the reservation information includes the passenger position of a passenger, the reservation information may further include the weight of each passenger or the like. The reservation information may further include information concerning the weight of a baggage carried by the passenger.

Although, in the embodiment described above and the like, examples have been described where the transported object is a passenger, the transported object may be a baggage put on the moving body.

Although, in the embodiment described above and the like, examples have been described where the reservation information is reservation information on a passenger, the reservation information may be reservation information on a baggage to be put on the moving body. The reservation information on a baggage include at least the position where the baggage is put in the moving body and the weight of the baggage. The reservation information on a baggage may include delivery plan information, such as the time of collection of the baggage, the time of delivery of the baggage, the place of collection of the baggage, and the destination of delivery of the baggage, and information about the type of the baggage or the like. For example, the weight of the baggage need not be included in the reservation information, and may be estimated or determined from the type of the baggage.

Although, in variation 1 of the embodiment described above, an example has been described where the detection result is a detection result of a passenger, the detection result may be a detection result of a baggage put on the moving body. The detection result of a baggage may be a detection result of the position, the weight or the like of the baggage put in vehicle 20.

Although, in variation 2 of the embodiment described above, an example has been described where the attribute information is attribute information on a passenger, the attribute information may be attribute information on a baggage put on the moving body. The attribute information on a baggage includes at least one of "product name", "product number (such as product code)", "date of manufacture", and "place of manufacture" of the baggage put in vehicle 20. For example, the attribute information on a baggage may include information that can relate to a physical characteristic of the baggage.

Although, in variation 5 of the embodiment described above, an example has been described where the identification result is an identification result of a passenger, the identification result may be an identification result of a baggage put on the moving body. When an identification code (for example, the QR code (registered trademark)) identifying the baggage is attached to the surface or the like of the baggage, the authenticator identifies the put baggage based on the information obtained from the image of the identification code taken by the camera and the information for the authenticator to identify the baggage stored in the information manager. The result of the identification is an example of the identification result.

All or some of the components of the information processing system according to the embodiment or the like described above may be implemented by a cloud server or may be implemented as edge equipment mounted in the moving body. For example, when the moving body is an autonomous car, the prediction device according to the embodiment or the like may be implemented as a part of the autonomous driving device mounted on the autonomous car.

It should be noted that the order of steps in the processing described in the above embodiments is an example. However, the order of steps may be changed, or may be performed in parallel. It is also possible to skip a part of the steps.

Each of the constituent elements described in the above-described embodiments, etc., may be realized as a software or a large scale integration (LSI) circuit, which is typically an integrated circuit. These integrated circuits may be formed as separate chips, or may be formed as one chip so as to include the entire configuration or part of the configuration of each embodiment. LSI is described here, but the integrated circuit may also be referred to as an integrated circuit (IC), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used. Further, when development of a semiconductor technology or another derived technology provides a circuit integration technology which replaces LSI, as a matter of course, functional blocks may be integrated by using this technology.

The dividing of the functional blocks in each of the block diagrams is one example. It is possible that a plurality of functional blocks are implemented into a single functional block, that a single functional block is divided into a plurality of functional blocks, and that a function executed by a functional block is partially executed by another functional block. Furthermore, similar functions of a plurality of functional blocks may be executed by a single hardware or software in parallel or by time division.

The prediction device included in the information processing system may be implemented to a single device or a plurality of devices. For example, each of processing units of the prediction device may be implemented to two or more server devices. If the information processing system is implemented to a plurality of server devices, the constituent elements of the information processing system may be allocated to the plurality of server devices in any way. The communication method between the plurality of server devices is not particularly limited. The communication method between the constituent elements of the information processing system is not particularly limited.

At least part of the constituent elements included in the vehicle described in the embodiments may be included in the prediction device. For example, the dynamic estimator may be included in the prediction device.

Furthermore, the technique of the present disclosure may be the above-described program or a non-transitory computer-readable recording medium on which the program is recorded. Of course, the above-described program may be distributed via a transmission medium such as the Internet. For example, the program and digital signals made from the program may be transmitted via telecommunication line, wireless or wired communication line, network represented by the Internet, data broadcasting, and the like. The program and digital signals made from the program may be executed by being recorded on a recording medium and transmitted, executed by being transmitted via a network or the like, or executed by an independent other computer system.

Each of the elements in each of the above embodiments may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory.

INDUSTRIAL APPLICABILITY

The present disclosure can be applied to a wide variety of systems that operate a moving body.

The invention claimed is:

1. An information processing method executed by a computer, the method comprising:
    obtaining first transported-object information that is transported-object information including a position and a weight of a transported object on a moving body;
    obtaining a weight of the moving body;
    generating information indicating a predicted steering angle center value by inputting the first transported-object information obtained and the weight of the moving body obtained into a model generated using second transported-object information, a weight of the moving body, and a steering angle center value of the moving body, the second transported-object information being older transported-object information than the first transported-object information; and
    outputting the information indicating the predicted steering angle center value to the moving body.

2. The information processing method according to claim 1, wherein
    the predicted steering angle center value is set to be an initial value of a steering angle center of the moving body during travel corresponding to the first transported-object information.

3. The information processing method according to claim 1, wherein
    at least the position of the transported object included in the first transported-object information is reservation information of the moving body, and
    the information indicating the predicted steering angle center value is generated after the reservation information is confirmed.

4. The information processing method according to claim 1, wherein
    at least one of the position or the weight of the transported object included in the first transported-object information is determined based on output data of a weight sensor provided to the moving body.

5. The information processing method according to claim 1, wherein
    at least one of the position or the weight of the transported object included in the first transported-object information is determined based on a detection result of the transported object detected based on output data of an imaging sensor provided to the moving body.

6. The information processing method according to claim 5, wherein
    the detection result includes an identification result of identifying the transported object, and
    at least one of the position or the weight of the transported object included in the first transported-object information is determined based on attribute information of the transported object identified.

7. The information processing method according to claim 1, wherein
    the model is generated using a base model defined in advance.

8. The information processing method according to claim 7, wherein
the model is generated using a center of gravity of the moving body, the steering angle center value, and the base model, the center of gravity being calculated from the second transported-object information and the weight of the moving body.

9. The information processing method according to claim 1, wherein
the model is generated by machine learning using the second transported-object information and the weight of the moving body as training data and using the steering angle center value as reference data.

10. The information processing method according to claim 9, wherein
the model is generated using the training data that further includes attribute information of a transported object included in the second transported-object information.

11. The information processing method according to claim 9, wherein
the model is generated using the training data that further includes environment information of the moving body.

12. An information processing system comprising:
a processor; and
a memory that stores a program,
wherein, when the program is executed by the processor, the program causes the processor to function as:
a communicator that obtains (i) first transported-object information that is transported-object information including a position and a weight of a transported object on a moving body and (ii) a weight of the moving body; and
a generator that generates information indicating a predicted steering angle center value by inputting the first transported-object information obtained by the first obtainer and the weight of the moving body obtained by the second obtainer into a model generated using second transported-object information, a weight of the moving body, and a steering angle center value of the moving body, the second transported-object information being older transported-object information generated than the first transported-object information,
wherein the communicator further outputs the information indicating the predicted steering angle center value to the moving body.

13. A control device provided to a moving body, the control device comprising:
a processor; and
a memory that stores a program,
wherein, when the program is executed by the processor, the program causes the processor to function as:
a first obtainer that obtains first transported-object information that is transported-object information including a position and a weight of a transported object on a moving body;
a second obtainer that obtains a weight of the moving body;
a generator that generates information indicating a predicted steering angle center value by inputting the first transported-object information obtained by the first obtainer and the weight of the moving body obtained by the second obtainer into a model generated using second transported-object information, a weight of the moving body, and a steering angle center value of the moving body, the second transported-object information being older transported-object information than the first transported-object information; and
a setter that sets the predicted steering angle center value as a steering angle center value of the moving body.

14. An information processing method executed by a computer, the method comprising:
obtaining first transported-object information that is transported-object information including a position and a weight of a transported object on a moving body;
obtaining a weight of the moving body;
generating information indicating a predicted steering angle center value by inputting the first transported-object information obtained and the weight of the moving body obtained into a model generated using second transported-object information, a weight of the moving body, and a steering angle center value of the moving body, the second transported-object information being older transported-object information than the first transported-object information; and
setting the predicted steering angle center value as a steering angle center value of the moving body.

15. A non-transitory recording medium storing a program, the program causing a computer to execute:
obtaining first transported-object information that is transported-object information including a position and a weight of a transported object on a moving body;
obtaining a weight of the moving body;
generating information indicating a predicted steering angle center value by inputting the first transported-object information obtained and the weight of the moving body obtained into a model generated using second transported-object information, a weight of the moving body, and a steering angle center value of the moving body, the second transported-object information being older transported-object information than the first transported-object information; and
outputting the information indicating the predicted steering angle center value to the moving body.

16. A non-transitory recording medium storing a program, the program causing a computer to execute:
obtaining first transported-object information that is transported-object information including a position and a weight of a transported object on a moving body;
obtaining a weight of the moving body;
generating information indicating a predicted steering angle center value by inputting the first transported-object information obtained and the weight of the moving body obtained into a model generated using second transported-object information, a weight of the moving body, and a steering angle center value of the moving body, the second transported-object information being older transported-object information than the first transported-object information; and
setting the predicted steering angle center value as a steering angle center value of the moving body.

* * * * *